US011209947B2

(12) United States Patent
Zhang

(10) Patent No.: US 11,209,947 B2
(45) Date of Patent: Dec. 28, 2021

(54) TOUCH STRUCTURE AND TOUCH PANEL

(71) Applicant: BOE TECHNOLOGY GROUP CO., LTD., Beijing (CN)

(72) Inventor: Hao Zhang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/634,987

(22) PCT Filed: Apr. 29, 2019

(86) PCT No.: PCT/CN2019/084881
§ 371 (c)(1),
(2) Date: Jan. 29, 2020

(87) PCT Pub. No.: WO2019/218866
PCT Pub. Date: Nov. 21, 2019

(65) Prior Publication Data
US 2020/0379605 A1 Dec. 3, 2020

(30) Foreign Application Priority Data
May 14, 2018 (CN) .......................... 201810457765.6

(51) Int. Cl.
*G06F 3/044* (2006.01)
(52) U.S. Cl.
CPC .......... *G06F 3/0446* (2019.05); *G06F 3/0445* (2019.05); *G06F 2203/04111* (2013.01); *G06F 2203/04112* (2013.01)
(58) Field of Classification Search
CPC ................ G06F 3/0446; G06F 3/0445; G06F 2203/04111; G06F 2203/04112; G06F 3/0412; G06F 3/044
See application file for complete search history.

(56) References Cited

U.S. PATENT DOCUMENTS

2010/0259502 A1* 10/2010 Ema ...................... G06F 3/0445
345/174
2011/0157079 A1 6/2011 Wu et al.
(Continued)

FOREIGN PATENT DOCUMENTS

CN 102109940 A 6/2011
CN 103135842 A 6/2013
(Continued)

OTHER PUBLICATIONS

International Search Report and Written Opinion issued in corresponding International Application No. PCT/CN2019/084881, dated Aug. 1, 2019, with English language translation.
(Continued)

*Primary Examiner* — Mark W Regn
(74) *Attorney, Agent, or Firm* — McDermott Will and Emery LLP

(57) ABSTRACT

A touch structure includes a plurality of first touch electrodes, a plurality of second touch electrodes, a plurality of first touch electrode wires and a plurality of second touch electrode wires. Each first touch electrode and each second touch electrodes is crosswise arranged, and is configured to be insulated from one another; and each first touch electrode is coupled to at least one first touch electrode wire, each second touch electrode is coupled to at least one second touch electrode wire. Resistances of the plurality of first touch electrode wires are approximately equal, and resistances of the plurality of second touch electrode wires are approximately equal.

18 Claims, 16 Drawing Sheets

(56) References Cited

U.S. PATENT DOCUMENTS

| | | |
|---|---|---|
| 2013/0127775 A1 | 5/2013 | Yilmaz et al. |
| 2015/0022501 A1 | 1/2015 | Kita |
| 2016/0209952 A1* | 7/2016 | Lin ................... G06F 3/0443 |
| 2017/0090663 A1 | 3/2017 | Tang et al. |
| 2017/0308198 A1* | 10/2017 | Yoon ................. G06F 3/0445 |
| 2018/0032193 A1* | 2/2018 | Qu .................... G06F 3/04164 |

FOREIGN PATENT DOCUMENTS

| | | | |
|---|---|---|---|
| CN | 204242157 U | 4/2015 | |
| CN | 205318347 U | 6/2016 | |
| CN | 106227386 A | * 12/2016 | ....... G02F 1/133345 |
| CN | 106227386 A | 12/2016 | |
| CN | 106293225 A | 1/2017 | |
| CN | 206147569 U | 5/2017 | |
| CN | 108710447 A | 10/2018 | |

OTHER PUBLICATIONS

First Office Action issued in Chinese Application No. 201810457765. 6, dated Nov. 20, 2019, with English anguage translation.
Second Office Action issued in Chinese Application No. 201810457765. 6, dated Apr. 20, 2020, with English language translation.

\* cited by examiner

TOUCH STRUCTURE AND TOUCH PANEL

CROSS-REFERENCE TO RELATED APPLICATIONS

The present application is a national phase entry under 35 USC 371 of International Patent Application No. PCT/CN2019/084881 filed on Apr. 29, 2019, which claims priority to Chinese Patent Application No. 201810457765.6, filed with the Chinese Patent Office on May 14, 2018, which are incorporated herein by reference in their entirety.

TECHNICAL FIELD

The present disclosure relates to the field of touch technologies, and in particular, to a touch structure and a touch screen.

BACKGROUND

With the development of display technologies, technologies of the touch screen (i.e., the display screen having a touch function) have entered a period of rapid development. Capacitive touch screens have attracted more and more attention due to their high positioning accuracy and sensitivity, good touch feel, and long service life.

The capacitive touch screens may be classified into self-capacitive touch screens and mutual-capacitive touch screens according to different touch manners. Since the mutual-capacitive touch screens may achieve multi-touch, the mutual-capacitive touch screens have become a mainstream product and a future development trend in a current touch screen market.

SUMMARY

In an aspect, a touch structure is provided. The touch structure includes a plurality of first touch electrodes, a plurality of second touch electrodes, a plurality of first touch electrode wires, and a plurality of second touch electrode wires. Each first touch electrode and each second touch electrode is crosswise arranged, and is configured to be insulated from each other. Each first touch electrode is coupled to at least one first touch electrode wire, and each second touch electrode is coupled to at least one second touch electrode wire. Resistances of the plurality of first touch electrode wires are approximately equal, resistances of the plurality of second touch electrode wires are approximately equal. The plurality of first touch electrode wires and the plurality of second touch electrode wires have substantially a same extending direction.

In some embodiments, each first touch electrode extends in a first direction, and the plurality of first touch electrodes are successively arranged in a direction perpendicular to the first direction. Each second touch electrode extends in a second direction, and the plurality of second touch electrodes are successively arranged in a direction perpendicular to the second direction. An angle between the first direction and the second direction is greater than 0°, and is less than or equal to 90°.

In some embodiments, each first touch electrode wire is coupled to a corresponding first touch electrode through a first coupling point that is located at an end of the first touch electrode wire. And/or, each second touch electrode wire is coupled to a corresponding second touch electrode through a second coupling point that is located at an end of the second touch electrode wire.

In some embodiments, the plurality of second touch electrode wires have a same length, the plurality of second touch electrode wires have a same resistivity, and the plurality of second touch electrode wires have a same cross-sectional area.

In some embodiments, each first touch electrode is composed of a plurality of first metal wires and each second touch electrode is composed of a plurality of second metal wires. The plurality of first metal wires are crossed, and the first touch electrode has a mesh shape; and/or, the plurality of second metal wires are crossed, and the second touch electrode has a mesh shape.

In some embodiments, each first touch electrode and each second touch electrode is separated by at least one insulating layer that is at least located at position where each first touch electrode intersects with each second touch electrode.

In some embodiments, the plurality of first touch electrodes and the plurality of second touch electrodes are disposed on both sides of the insulating layer respectively. The plurality of second touch electrode wires are disposed in a same layer as the plurality of first touch electrodes, and the plurality of first touch electrode wires are disposed in a same layer as the plurality of first touch electrodes or the plurality of second touch electrodes.

In some embodiments, each second touch electrode is of an integrated structure. Each first touch electrode includes a plurality of first touch sub-electrodes spaced apart and a plurality of first bridge portions, and every two adjacent first touch sub-electrodes are coupled through at least one first bridge portion. The plurality of first touch sub-electrodes are disposed in a same layer as the plurality of second touch electrodes. Each first bridge portion and a corresponding second touch electrode are crosswise arranged. The plurality of second touch electrode wires are disposed in a same layer as the plurality of first bridge portions. The plurality of first touch electrode wires are disposed in a same layer as the plurality of first bridge portions or all of the first touch sub-electrodes.

In some embodiments, in each first touch electrode, other than first touch sub-electrodes at two outermost ends, remaining first touch sub-electrodes each have a diamond shape. Each second touch electrode includes a plurality of second touch sub-electrodes spaced apart and a plurality of second connection portions, and every two adjacent second touch sub-electrodes are connected through at least one second connection portion. In each second touch electrode, other than second touch sub-electrodes at two outermost ends, remaining second touch sub-electrodes each have a diamond shape. The first touch sub-electrodes at the two outermost ends each have a shape of an isosceles triangle, and a top angle of each first touch sub-electrode is more proximate to other first sub-electrodes with the diamond shape in the first touch electrode than a bottom edge of each first touch sub-electrode. And/or, the second touch sub-electrodes at the two outermost ends each have a shape of an isosceles triangle, and a top angle of each second touch sub-electrode is more proximate to other second sub-electrodes with the diamond shape in the second touch electrode than a bottom edge of each second touch sub-electrode.

In some embodiments, in each first touch electrode, other than first touch sub-electrodes at two outermost ends, remaining first touch sub-electrodes each include a first cross-shaped body composed of two first strip-shaped portions crosswise arranged, and at least a plurality of pairs of first branches, each pair of first branches extends from a first strip-shaped portion and is symmetrically arranged relative to the first strip-shaped portion. Each second touch electrode includes a plurality of second touch sub-electrodes connected in a sequence. In each second touch electrode, other than second touch sub-electrodes at two outermost ends, remaining second touch sub-electrodes each include a second cross-shaped body formed of two second strip-shaped portions crosswise arranged, and at least a plurality of pairs of second branches, each pair of second branches extends from a second strip-shaped portion and is symmetrically arranged relative to the second strip-shaped portion.

In some embodiments, each first touch electrode is of an integrated structure. Each second touch electrode includes a plurality of second touch sub-electrodes spaced apart and a plurality of second bridge portions, and every two adjacent second touch sub-electrodes are coupled through at least one second bridge portion. The plurality of second touch sub-electrodes are disposed in a same layer as the plurality of first touch electrodes. Each second bridge portion and a corresponding first touch electrode are crosswise arranged. The second touch electrode wires are disposed in a same layer as the plurality of second touch sub-electrodes or the plurality of second bridge portions. Or, a portion of at least one second touch electrode wire is disposed in a same layer as the plurality of second touch sub-electrodes, and another portion of the at least one second touch electrode wire is disposed in a same layer as the plurality of second bridge portions. And the plurality of first touch electrode wires are disposed in a same layer as the plurality of first touch electrodes or the plurality of second bridge portions.

In some embodiments, each first touch electrode includes a plurality of first touch sub-electrodes spaced apart and a plurality of first connection portions, and every two adjacent first touch sub-electrodes are connected through at least one first connection portion. In each first touch electrode, other than first touch sub-electrodes at two outermost ends, remaining first touch sub-electrodes each have a diamond shape. In each second touch electrode, other than second touch sub-electrodes at two outermost ends, remaining second touch sub-electrodes each have a diamond shape. And each second touch electrode wire is disposed at a gap between some of the second touch electrodes and a portion of a first touch electrode. The plurality of second touch electrode wires are disposed in a same layer as the plurality of second touch sub-electrodes. Or, at least one second touch electrode wire includes at least one first wire segment and at least one second wire segment, and in an extending path of the second touch electrode wire, the second touch electrode wire spans at least one second bridge portion. An orthographic projection of each first wire segment on a plane where the at least one first wire segment is located does not overlap with an orthographic projection of any second bridge portion on the plane, and the at least one first wire segment is disposed in a same layer as the plurality of second bridge portions. An orthographic projection of each second wire segment on the plane exceeds a range of an orthographic projection of a corresponding second bridge portion on the plane, and the at least one second wire segment is disposed in a same layer as the plurality of second touch sub-electrodes.

In some embodiments, each first touch electrode includes a plurality of first touch sub-electrodes connected in a sequence. In each first touch electrode, other than first touch sub-electrodes at two outermost ends, remaining first touch sub-electrodes each include a first cross-shaped body composed of two first strip-shaped portions crosswise arranged, and at least a plurality of pairs of first branches, each pair of first branches extends from a first strip-shaped portion and is symmetrically arranged relative to the first strip-shaped portion. In each second touch electrode, other than second touch sub-electrodes at two outermost ends, remaining second touch sub-electrodes each include a second cross-shaped body composed of two second strip-shaped portions crosswise arranged, and at least a plurality of pairs of second branches, each pair of second branches extends from a second strip-shaped portion and is symmetrically arranged relative to the second strip-shaped portion. The plurality of second touch electrode wires are disposed in a same layer as the plurality of second bridge portions.

In some embodiments, the first touch sub-electrodes at the two outermost ends each have a shape of an isosceles triangle, and a top angle of each first touch sub-electrode is more proximate to other first sub-electrodes with the diamond shape in the first touch electrode than a bottom edge of the first touch sub-electrode. And/or, the second touch sub-electrodes at the two outermost ends each have a shape of an isosceles triangle, and a top angle of each second touch sub-electrode is more proximate to other second sub-electrodes with the diamond shape in the second touch electrode than a bottom edge of the second touch sub-electrode.

In some embodiments, in each of the remaining first touch sub-electrodes, first branches extending from one first strip-shaped portion are obliquely disposed in a direction away from another first strip-shaped portion. And/or, in each of the remaining second touch sub-electrodes, second branches extending from one second strip-shaped portion are obliquely disposed in a direction away from another second strip-shaped portion.

In some embodiments, in each first touch electrode, the first touch sub-electrodes at the two outermost ends each include: a first T-shaped body composed of a third strip-shaped portion and a fourth strip-shaped portion in which an end of the third strip-shaped portion is connected to the fourth strip-shaped portion, and at least a plurality of pairs of third branches; at least one pair of third branches extends from the third strip-shaped portion and is symmetrically arranged relative to the third strip-shaped portion, and at least one pair of third branches extends from the fourth strip-shaped portion and is symmetrically arranged relative to the third strip-shaped portion. All of the third branches and the third strip-shaped portion are located at a same side of the fourth strip-shaped portion proximate to other first touch sub-electrodes in the first touch electrode. And/or, in each second touch electrode, the second touch sub-electrodes at the two outermost ends each include: a second T-shaped body composed of a fifth strip-shaped portion and a sixth strip-shaped portion in which an end of the fifth strip-shaped portion is connected to the sixth strip-shaped portion, and at least a plurality of pairs of fourth branches; at least one pair of fourth branches extends from the fifth strip-shaped portion and is symmetrically arranged relative to the fifth strip-shaped portion, and at least one pair of fourth branches extends from the sixth strip-shaped portion and is symmetrically arranged relative to the fifth strip-shaped portion. All of the fourth branches and the fifth strip-shaped are located at a same side of the sixth strip-shaped portion proximate to other second touch sub-electrodes in the second touch electrode.

In some embodiments, the touch structure further includes at least one dummy touch electrode. Each dummy touch electrode is disposed between a first branch and a second branch that are adjacent to each other.

In another aspect, a touch screen is provided. The touch screen includes the touch structure according to any embodiment of the above embodiments.

In some embodiments, the touch screen further includes a display panel. The touch structure is disposed on a light exit side of the display panel.

In some embodiments, the display panel is an OLED display panel.

In some embodiments, the OLED display panel includes a flexible base, a plurality of OLED devices disposed on the flexible base, and a thin film encapsulation (TFE) layer. The touch structure is disposed on a side of the TFE layer away from the flexible base.

In some embodiments, the plurality of first touch electrode wires have a same length.

BRIEF DESCRIPTION OF THE DRAWINGS

In order to describe technical solutions in embodiments of the present disclosure or in the related art more clearly, the accompanying drawings to be used in the description of embodiments or in the related art will be introduced briefly. Obviously, the accompanying drawings to be described below are merely some embodiments of the present disclosure, and a person of ordinary skill in the art may obtain other drawings according to these drawings without paying any creative effort.

DETAILED DESCRIPTION

In order to make the objects, technical solutions and advantages of embodiments of the present disclosure clearer, the technical solutions in the embodiments of the present disclosure will be described clearly and completely with reference to the accompanying drawings in the embodiments of the present disclosure. Obviously, the described embodiments are merely some but not all of embodiments of the present disclosure. All other embodiments made on the basis of the embodiments of the present disclosure by a person of ordinary skill in the art without paying any creative effort shall be included in the protection scope of the present disclosure.

Figure 1A:
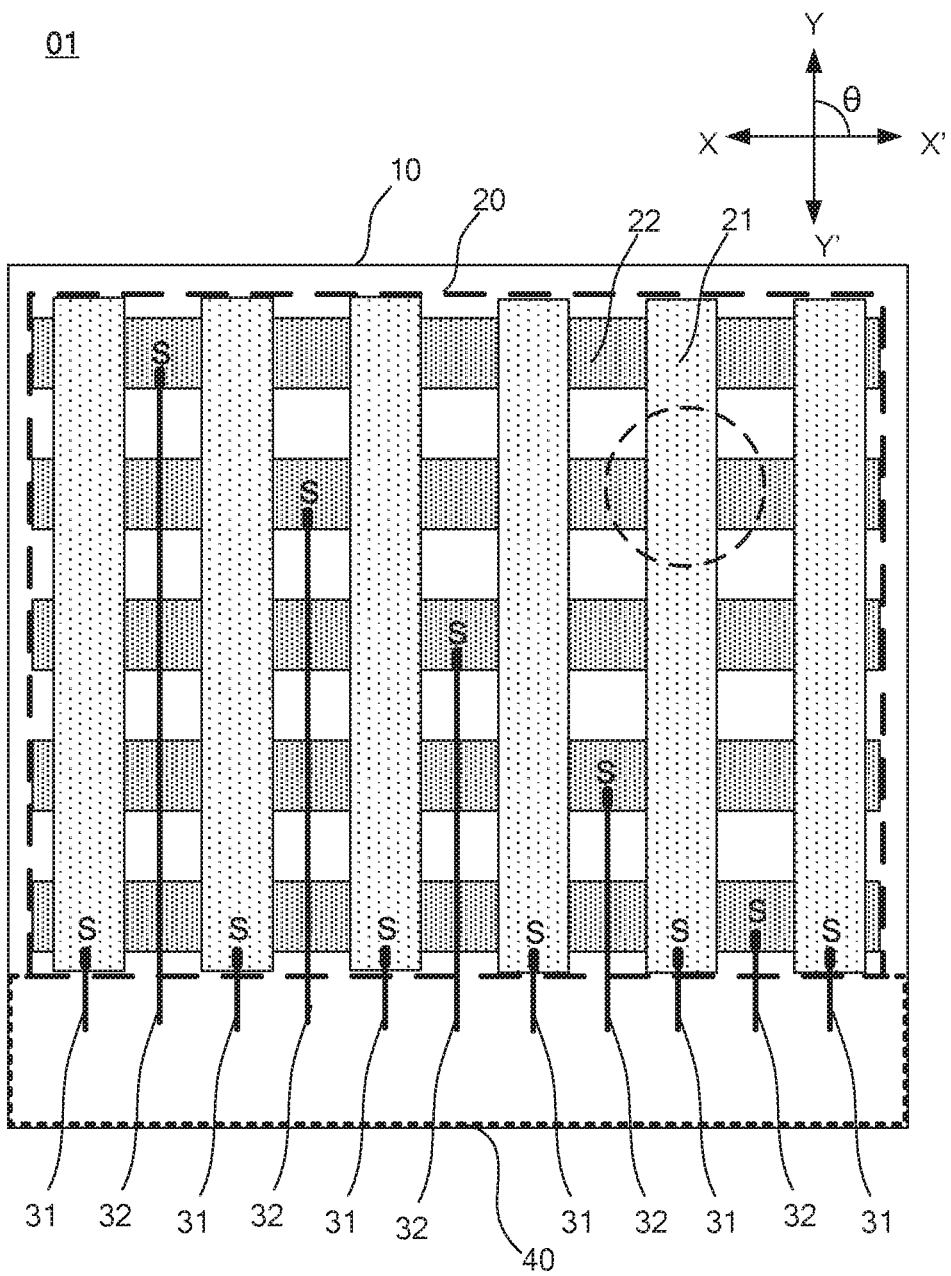
FIG. 1A is a schematic top view of a touch structure, according to some embodiments of the present disclosure.
Figure 2A:
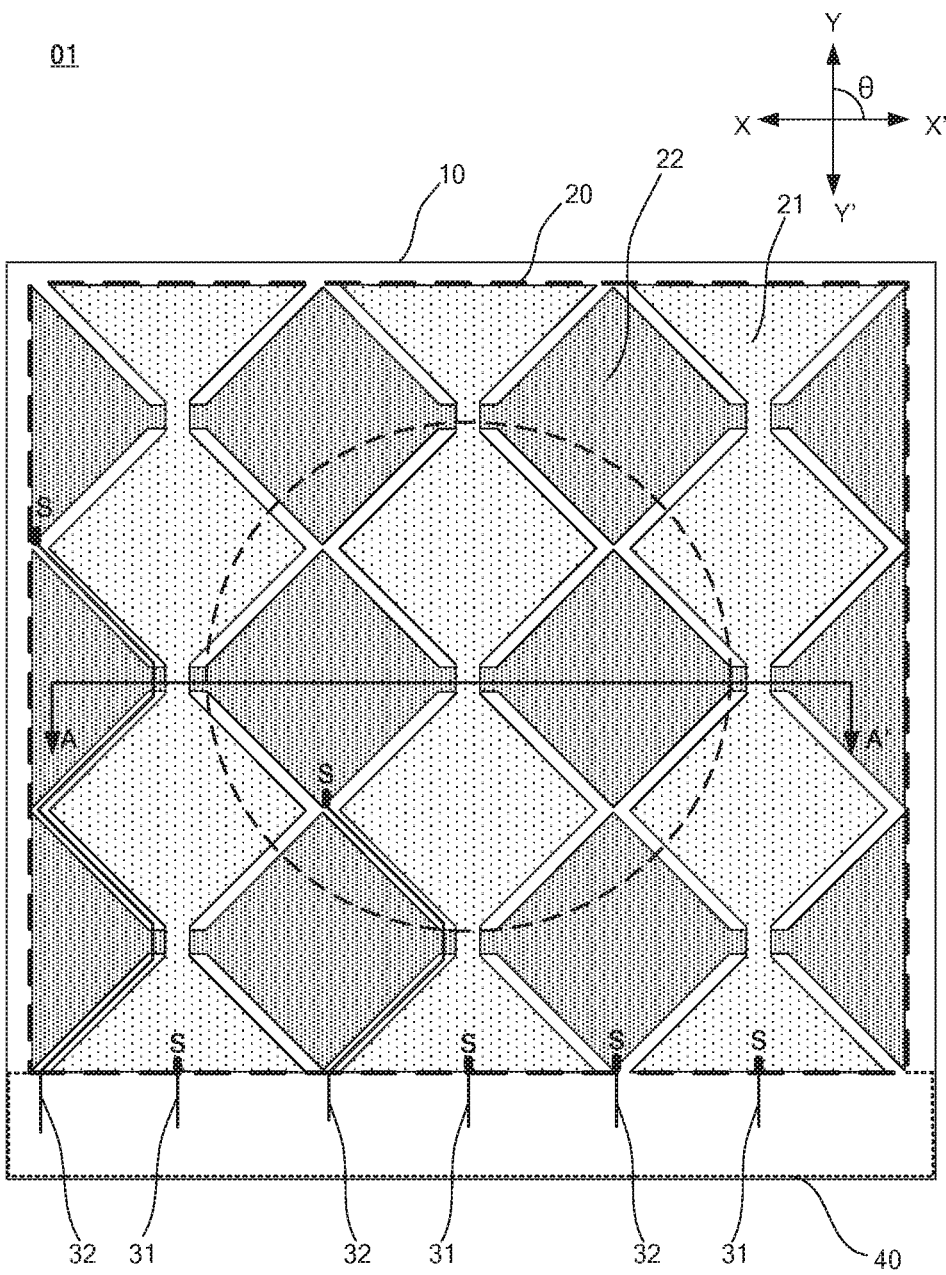
FIG. 2A is a schematic top view of another touch structure, according to some embodiments of the present disclosure.

Some embodiments of the present disclosure provide a touch structure. As shown in FIGS. 1A and 2A, the touch structure 01 includes a plurality of first touch electrodes 21, a plurality of second touch electrodes 22, a plurality of first touch electrode wires 31, and a plurality of second touch electrode wires 32, all of which are configured to be suitable to be disposed above a base 10. Arrangement manners of the elements of the touch structure 01 are as follows.

The plurality of first touch electrodes 21 and the plurality of second touch electrodes 22 are located in a touch region 20 of the base 10.

Each first touch electrode 21 and each second touch electrode 22 is crosswise arranged, and are configured to be insulated from each other.

Each first touch electrode 21 is coupled to at least one first touch electrode wire 31, and each second touch electrode 22 is coupled to at least one second touch electrode wire 32. Starting from respective starting points S in the touch region 20, each first touch electrode wire 31 and each second touch electrode wire 32 extends from the touch region 20 toward a wiring region 40 on a side of the touch region 20 and into the wiring region 40.

It will be understood that term "a plurality of" means two or more in some embodiments of the present disclosure.

In some embodiments of the present disclosure, the touch structure 01 may include the base 10. The base 10 is configured to allow the plurality of first touch electrodes 21, the plurality of second touch electrodes 22, the plurality of first touch electrode wires 31, and the plurality of second touch electrode wires 32 to be placed thereabove.

In some embodiments of the present disclosure, in a case where the above touch structure 01 is applied in some scenarios, for example, in a case where the touch structure 01 is disposed on a surface of a display panel (or the touch structure 01 is integrated into the display panel), the touch structure 01 may not include the base 10, and the base 10 may be a structural layer in the display panel proximate to a light exit side of the display panel (or a certain structural layer in the display panel). Or, a structural layer on the surface of the display panel (or in the display panel) may be used as the base 10, so as to arrange the plurality of first touch electrodes 21, the plurality of second touch electrodes 22, the plurality of first touch electrode wires 31, and the plurality of second touch electrode wires 32 above the base 10.

Therefore, an arrangement manner of the base 10 may be flexibly adjusted according to actual needs. Some embodiments of the present disclosure do not limit this.

In some embodiments of the present disclosure, the first touch electrodes 21 may be touch transmitting electrodes (Tx, indicating "transmit"), and the second touch electrodes 22 may be touch receiving electrodes (Rx, indicating "receive"). Or, the first touch electrodes 21 may be receiving electrodes Rx, and the second touch electrodes 22 may be transmitting electrodes Tx. Some embodiments of the present disclosure do not limit this.

Moreover, a shape and the number of the first touch electrodes 21, and a shape and the number of the second touch electrodes 22 are not limited, which may be selected according to actual needs, as long as a position of a touch point may be determined by detecting capacitances.

For example, as shown in FIG. 1A, each entire first touch electrode 21 and each entire second touch electrode 22 is strip-shaped. In this case, a region where a first touch electrode 21 intersects with a second touch electrode 22 (as shown by the dotted circle in FIG. 1A) has a certain area.

Figure 1B:
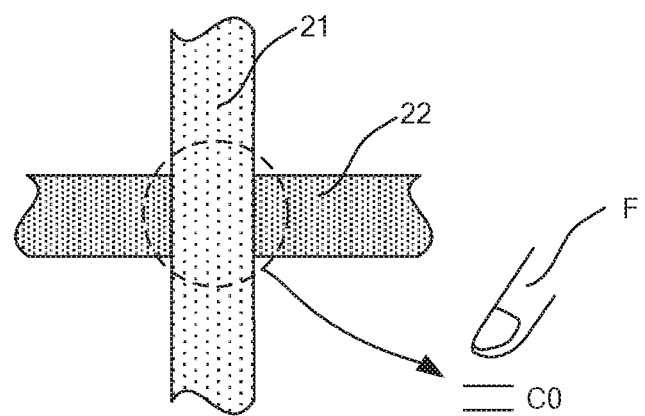
FIG. 1B is a schematic diagram showing a touch principle of the touch structure shown in FIG. 1A.

Since each first touch electrode 21 and each second touch electrode 22 is configured to be insulated from each other, as shown in FIG. 1B, a capacitance C0 will exist in the region where the first touch electrode 21 intersects with the second touch electrode 22. In a case where a conductor (such as a finger F) touches the region where the first touch electrode 21 intersects with the second touch electrode 22, the original capacitance in the region will be changed, and the position of the touch point may be obtained by detecting the change of the capacitances.

For another example, as shown in FIG. 2A, the first touch electrodes 21 and the second touch electrodes 22 each includes a plurality of blocks connected in sequence. A plane shape of each block is, for example, a diamond (that is, a contour of an orthographic projection of the block on the base may have, for example, a diamond shape). In this case, there are four block electrodes proximate to each other around the region where the first touch electrode 21 intersects with the second touch electrode 22 (as shown by the dotted circle in FIG. 2A).

Figure 2B:
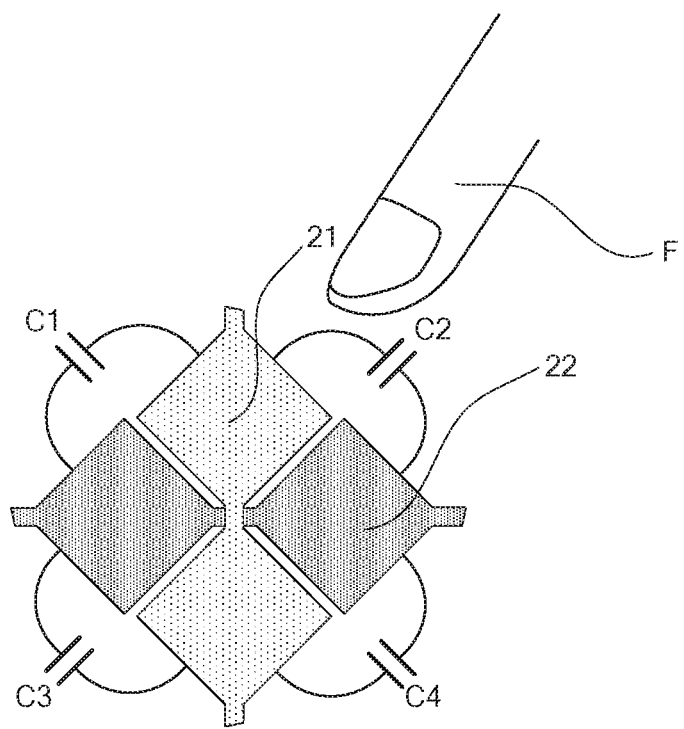
FIG. 2B is a schematic diagram showing a touch principle of the touch structure shown in FIG. 2A.

Since each first touch electrode 21 and each second touch electrode 22 is configured to be insulated from each other, as shown in FIG. 2B, a capacitance will exist between every two block electrodes insulated from each other in the four block electrodes, and all capacitances are labeled as C1, C2, C3 and C4. In a case where a conductor (such as the finger F) touches a region around the region where the first touch electrode 21 intersects with the second touch electrode 22, one or more of the above capacitances will be changed. The position of the touch point may be obtained by detecting the changes of the capacitances.

In addition, arrangement manners of the plurality of first touch electrodes 21 and the plurality of second touch electrodes 22 are not limited. A person skilled in the art will know that, there is a certain space between any two adjacent first touch electrodes 21 of the plurality of first touch electrodes 21 in the touch region 20, so that the two adjacent first touch electrodes 21 are insulated from each other. Similarly, there is a certain space between any two adjacent second touch electrodes 22 of the plurality of second touch electrodes 22 in the touch region 20, so that the two adjacent second touch electrodes 22 are insulated from each other.

Starting from a starting point S, each first touch electrode wire 31 extends in a certain path in the touch region 20 until reaching a boundary of the touch region 20 and the wiring region 40, and continues to extend into the wiring region 40. Similarly, starting from a starting point S, each second touch electrode wire 32 extends in a certain path in the touch region 20 until reaching the boundary of the touch region 20 and the wiring region 40, and continues to extend into the wiring region 40.

That is to say, in paths of each first touch electrode wire 31 and each second touch electrode wire 32 extending from the respective starting points S to the wiring region 40, in a case where the first touch electrode wire 31 and the second touch electrode wire 32 exceed the touch region 20, the first touch electrode wire 31 and the second touch electrode wire 32 will enter the wiring region 40. That is, each touch electrode wire is configured in a way that one portion is located in the touch region 20, and another portion is located in the wiring region 40.

In some embodiments of the present disclosure, each first touch electrode 21 may be coupled to (i.e., electrically connected to) one or more first touch electrode wires 31, and the number of the first touch electrode wires 31 coupled to different first touch electrodes 21 may be exactly the same, totally different, or not be exactly the same.

Similarly, each second touch electrode 22 may be coupled to (i.e., electrically connected to) one or more second touch electrode wires 32, and the number of the second touch electrode wires 32 coupled to different second touch electrodes 22 may be exactly the same, totally different, or not be exactly the same.

That is, the number of the first touch electrode wires 31 coupled to each first touch electrode 21 and the number of the second touch electrode wires 32 coupled to each second touch electrode 22 may be flexibly set according to actual needs. Some embodiments of the present disclosure do not limit this.

Some embodiments of the present disclosure are described by only taking an example in which each first touch electrode 21 is coupled to a first touch electrode wire 31, and each second touch electrode 22 is coupled to a second touch electrode wire 32.

In addition, as shown in FIGS. 1A and 2A, a length of a side of the wiring region 40 proximate to the touch region 20 may be greater than a length of a side of the touch region 20 proximate to the wiring region 40. Of course, the length of the side of the wiring region 40 facing the touch region 20 may also be less than or equal to the length of the side of the touch region 20 facing the wiring region 40, which may be flexibly set according to actual needs. A size of the wiring region 40 is not limited, as long as the wiring region 40 is located on a side of the touch region 20.

In some embodiments of the present disclosure, starting from the respective starting points S in the touch region 20, each first touch electrode wire 31 and each second touch electrode wire 32 extends from the touch region 20 to the wiring region 40 on a side of the touch region 20. That is, a portion of each first touch electrode wire 31 and a portion of each second touch electrode wire 32 that exceed the touch region 20 are only located in the wiring region 40 on a side of the touch region 20.

In this way, in a case where the touch structure 01 is applied to a display device, touch electrode wires converge into the wiring region outside the touch region 20, which is advantageous for realizing a narrow bezel design or an ultra-narrow bezel design of the display device without affecting a touch performance and a display performance.

Here, the touch electrode wires are usually made of a metal material with a low resistivity (such as Cu). The metal material is usually opaque (or the metal material has a low light transmittance). In the case where the touch structure 01 is applied to the display device, since the touch region 20 usually at least partially overlap with a display region (for example, the touch region 20 corresponds to and completely overlaps with the display region), a width of each touch electrode wire may be set to be very small, so that the touch electrode wire is not easily perceived by human eyes. Thereby, the touch electrode wires will not affect an overall shadow elimination effect of the touch structure 01 (that is, an opaque portion of the touch structure 01 will not be easily perceived by the human eyes).

In some embodiments of the present disclosure, as shown in FIGS. 1A and 2A, each first touch electrode 21 extends in a first direction Y-Y', and the plurality of first touch electrodes 21 are successively arranged in a direction perpendicular to the first direction Y-Y'. Each second touch electrode 22 extends in a second direction X-X', and the plurality of second touch electrodes 22 are successively arranged in a direction perpendicular to the second direction X-X'. An angle θ between the first direction Y-Y' and the second direction X-X' is greater than 0°, and is less than or equal to 90°.

Here, FIGS. 1A and 2A only show an example in which the angle θ between the first direction Y-Y' and the second direction X-X' is 90° (that is, the first direction Y-Y' and the second direction X-X' are perpendicular to each other). The angle θ between the first direction Y-Y' and the second direction X-X' may also be, for example, any value of 10°, 15°, 30°, 45°, 60°, and 75°, and may be flexibly set according to actual needs. Some embodiments of the present disclosure do not limit this.

As shown in FIGS. 1A and 2A, in a case where the angle θ between the first direction Y-Y' and the second direction X-X' is 90°, for example, the first direction Y-Y' may be a vertical direction on a paper surface. Correspondingly, the second direction X-X' may be, for example, a horizontal direction on the paper surface.

For convenience of description, the first direction Y-Y' will be represented by the "vertical direction", and the second direction X-X' will be represented by the "horizontal direction" below.

In this way, each first touch electrode 21 extends in the vertical direction, and the plurality of first touch electrodes 21 are successively arranged in the horizontal direction. Each second touch electrode 22 extends in the horizontal direction, and the plurality of second touch electrodes 22 are successively arranged in the vertical direction.

In this way, as shown in FIGS. 1A and 2A, as for the plurality of second touch electrodes 22, a first second touch electrode 22 and a last second touch electrode 22 are two second touch electrodes 22 most proximate to an edge of the touch region 20 in the vertical direction. The wiring region 40 is located at a side of one of the two second touch electrodes 22 that is away from the other second touch electrode 22, the two second touch electrodes 22 being most proximate to an edge of the touch region 20.

The two second touch electrodes 22 most proximate to the edge of the touch region 20 are an uppermost second touch electrode 22 (taking the paper surface as a reference) and a lowermost second touch electrode 22 (taking the paper surface as the reference). Therefore, the wiring region 40 may be disposed at a side proximate to the uppermost second touch electrode 22 (that is, taking the paper surface as the reference, the wiring region 40 is disposed above the uppermost second touch electrode 22). Or, the wiring region 40 may be disposed at a side proximate to the lowermost second touch electrode 22 (that is, taking the paper surface as the reference, the wiring region 40 is disposed below the lowermost second touch electrode 22).

FIGS. 1A and 2A only show an example in which the wiring region 40 is disposed at the side proximate to the lowermost second touch electrode 22.

In this way, in some embodiments of the present disclosure, in the case where the touch structure 01 is applied to the display device, the set position of the wiring region 40 may be more advantageous for achieving the narrow bezel design or even the ultra-narrow bezel design of the display device.

In some embodiments of the present disclosure, the starting point S of each first touch electrode wire 31 in the touch region 20 is an end of two ends of the first touch electrode wire 31 that is located in the touch region 20.

Moreover, each first touch electrode wire 31 may be coupled to a corresponding first touch electrode 21 through at least one first coupling point S1, so as to achieve an electrical connection between the first touch electrode wire and the first touch electrode.

Here, the first coupling point refers to a region of the first touch electrode wire 31 directly connected to the corresponding first touch electrode 21 or a region of the first touch electrode wire 31 connected to the corresponding first touch electrode 21 through a via hole in an insulating layer. Since an area of the region is usually very small, the region is referred to as a "point".

The starting point S may overlap or not overlap with the first coupling point S1, and a specific arrangement manner is as follows.

Figure 3A:
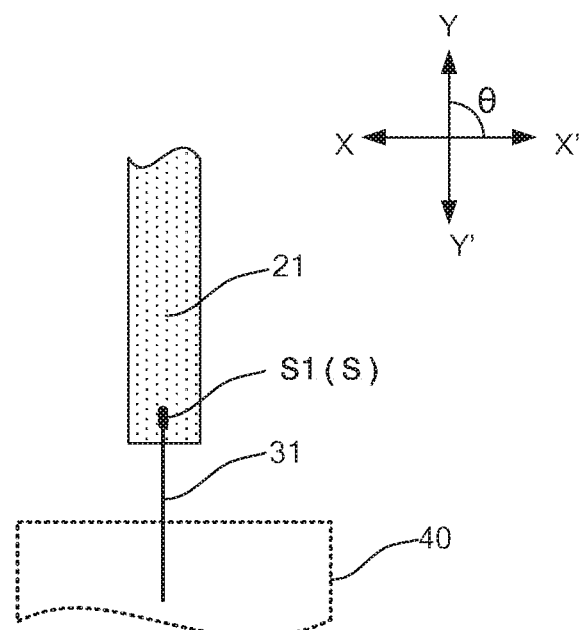
FIG. 3A shows an arrangement manner of a first coupling point in a first touch electrode wire in a touch structure, according to some embodiments of the present disclosure.
Figure 3B:
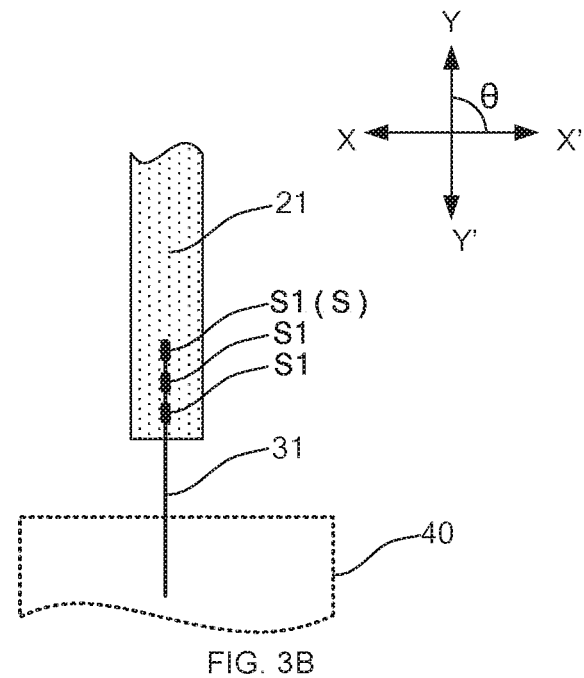
FIG. 3B shows another arrangement manner of first coupling points in a first touch electrode wire in a touch structure, according to some embodiments of the present disclosure.
Figure 3C:
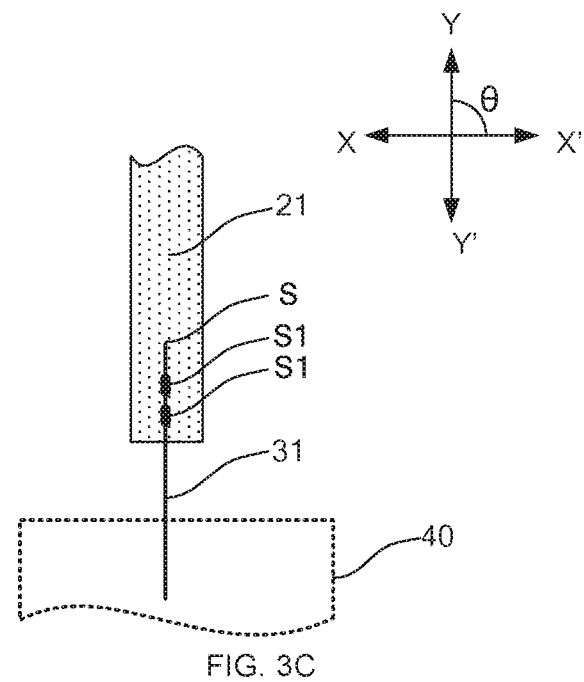
FIG. 3C shows yet another arrangement manner of first coupling points in a first touch electrode wire in a touch structure, according to some embodiments of the present disclosure.

As shown in FIGS. 3A and 3B, in each first touch electrode wire 31, one of the at least one first coupling point S1 that is farthest from the wiring region 40 is the starting point S.

For example, as shown in FIG. 3A, in a case where a first touch electrode wire 31 is coupled to a corresponding first touch electrode 21 through one first coupling point S1, the first coupling point S1 is the starting point S. That is, the first touch electrode wire 31 is coupled to the corresponding first touch electrode 21 at the starting point S.

For example, as shown in FIG. 3B, in a case where a first touch electrode wire 31 is coupled to a corresponding first touch electrode 21 through a plurality of (for example, three) first coupling points S1 arranged in the vertical direction, a first coupling point S1 farthest from the wiring region 40 is the starting point S.

Here, since a width of the first touch electrode wire 31 is generally very small, in a case where the first touch electrode wire 31 is provided with the plurality of first coupling points S1, these first coupling points S1 are generally not arranged in the horizontal direction for ease of arrangement.

Of course, as shown in FIG. 3O, all (for example, two) first coupling points S1 in a first touch electrode wire 31 may also be located in a region of the first touch electrode wire 31 proximate to the starting point S. That is, all the first coupling points S1 do not overlap with the starting point S.

In some embodiments of the present disclosure, a starting point S of each second touch electrode wire 32 in the touch region 20 is an end of two ends of the second touch electrode wire 32 that is located in the touch region 20.

Moreover, each second touch electrode wire 32 may be coupled to a corresponding second touch electrode 22 through at least one second coupling point S2, so as to achieve an electrical connection between the second touch electrode wire 32 and the second touch electrode 22.

Here, a second coupling point refers to a region of each second touch electrode wire 32 directly connected to the corresponding second touch electrode 22 or a region of each second touch electrode wire 32 connected to the corresponding second touch electrode 22 through a via hole in an insulating layer. Since an area of the region is usually very small, the region is referred to as a "point".

The starting point S may overlap or not overlap with the second coupling point S2, and a specific arrangement manner is as follows.

Figure 4A:
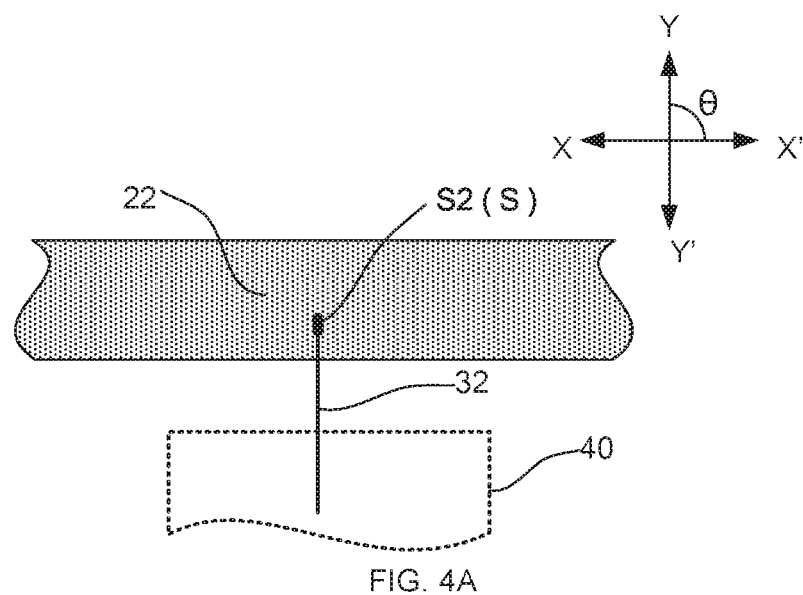
FIG. 4A shows an arrangement manner of a second coupling point in a second touch electrode wire in a touch structure, according to some embodiments of the present disclosure.
Figure 4B:
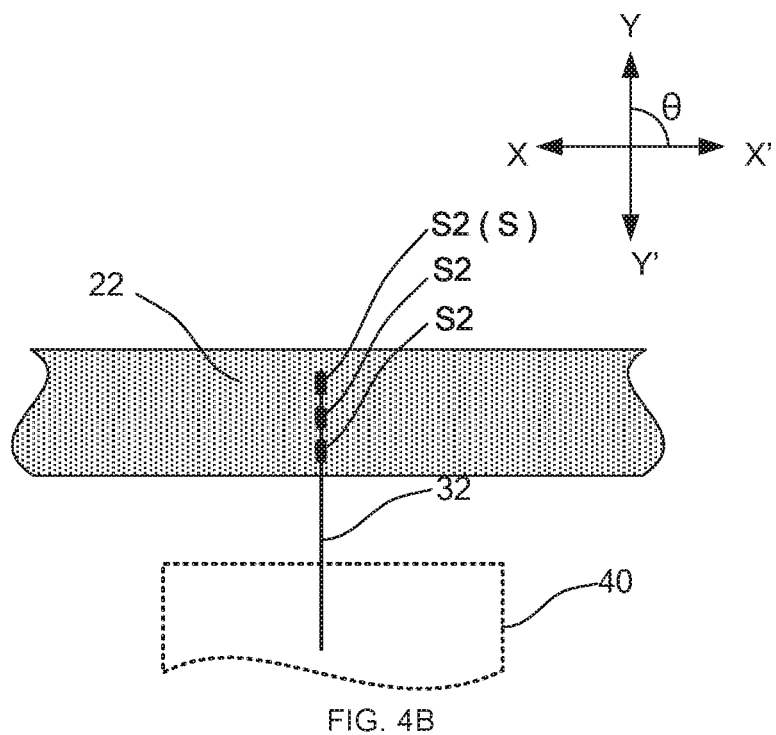
FIG. 4B shows another arrangement manner of second coupling points in a second touch electrode wire in a touch structure, according to some embodiments of the present disclosure.
Figure 4C:
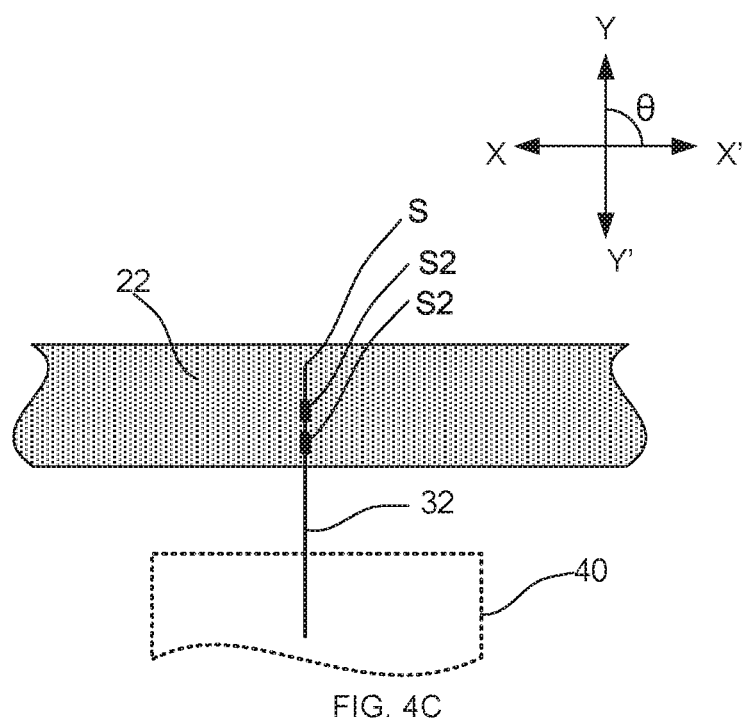
FIG. 4C shows yet another arrangement manner of second coupling points in a second touch electrode wire in a touch structure, according to some embodiments of the present disclosure.

As shown in FIGS. 4A and 4B, in each second touch electrode wire 32, one of the at least one second coupling point S2 that is farthest from the wiring region 40 is the starting point S.

For example, as shown in FIG. 4A, in a case where a second touch electrode wire 32 is coupled to a corresponding second touch electrode 22 through one second coupling point S2, the second coupling point S2 is the starting point S. That is, the second touch electrode wire 32 is coupled to the corresponding the second touch electrode 22 at the starting point S.

For example, as shown in FIG. 4B, in a case where a second touch electrode wire 32 is coupled to a corresponding second touch electrode 22 through a plurality of (for example, three) second coupling points S2 arranged in the vertical direction, a second coupling point S2 farthest from the wiring region 40 is the starting point S.

Here, since a width of the second touch electrode wire 32 is generally very small, in a case where the second touch electrode wire 32 is provided with the plurality of second coupling points S2, these second coupling points S2 are generally not arranged in the horizontal direction for ease of arrangement.

Of course, as shown in FIG. 4O, all (for example, two) second coupling points S2 in a second touch electrode wire 32 may also be located in a region of the second touch electrode wire 32 proximate to the starting point S. That is, all the second coupling points S2 do not overlap with the starting point S.

On this basis, as shown in FIGS. 1A and 2A, in a case where the starting point S of each first touch electrode wire 31 is located at a bottom of the corresponding first touch electrode 21 proximate to the wiring region 40 (taking the paper surface as the reference), the first touch electrode wire 31 may directly extend downward into the wiring region 40. In this case, since a length of the first touch electrode wire 31 is very small, a difference in resistances of the first touch electrode wires 31 is very small.

Figure 5:
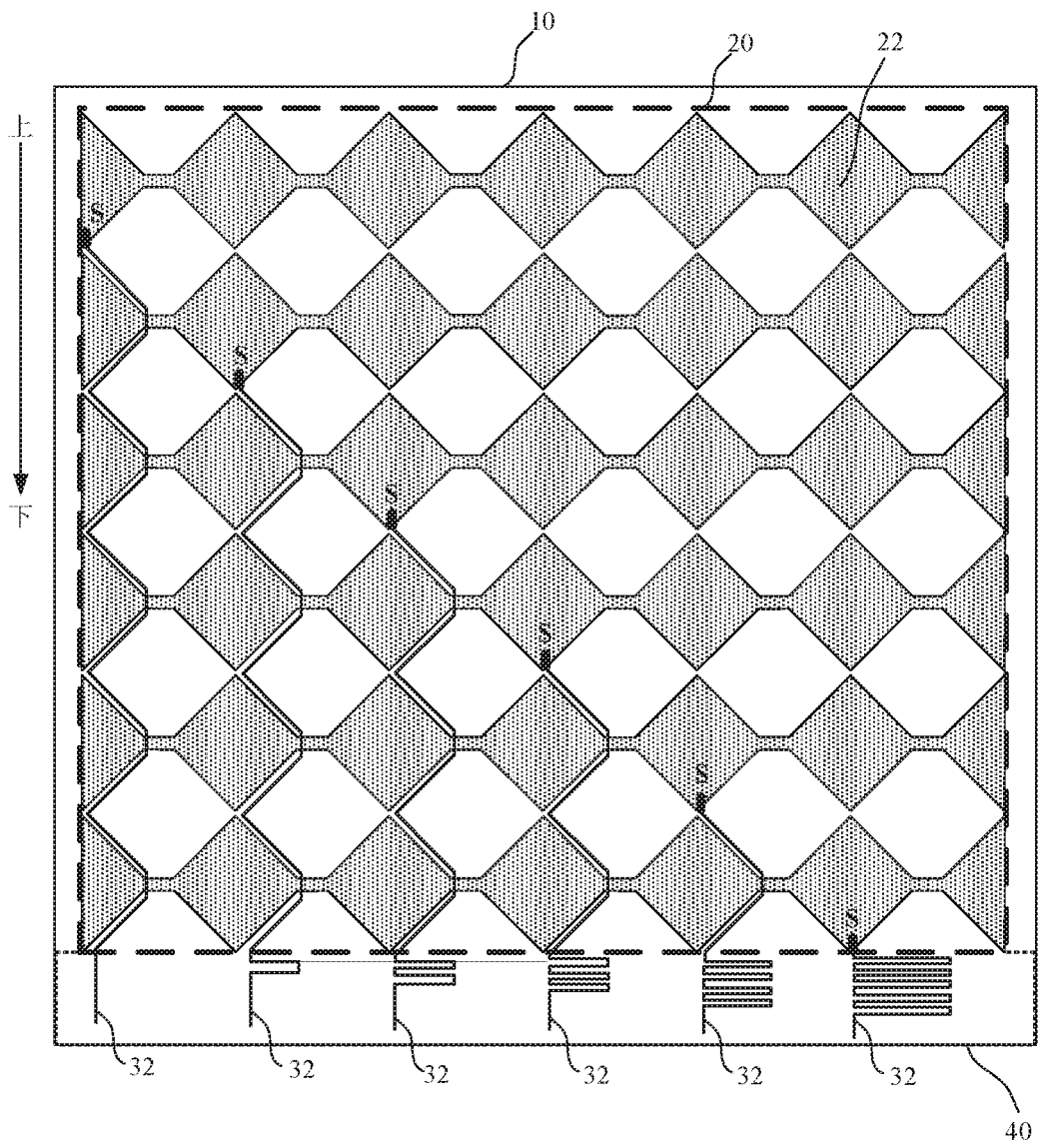
FIG. 5 is a schematic top view of second touch electrodes and corresponding second touch electrode wires in a touch structure, according to some embodiments of the present disclosure.

As for the plurality of second touch electrodes 22, since the plurality of second touch electrodes 22 are successively arranged in the vertical direction, distances between the second touch electrodes 22 and the wiring region 40 are different. As shown in FIG. 5, in an example where the wiring region 40 is disposed proximate to the lowermost second touch electrode 22, the second touch electrodes 22 are successively a first second touch electrode 22, a second second touch electrode 22, ... , and an nth second touch electrode from top to bottom, wherein n is a positive integer greater than or equal to 3.

Since the first second touch electrode 22 is farthest from the wiring region 40, a second touch electrode wire 32 corresponding to the first second touch electrode 22 correspondingly has a portion with the largest length in the touch region 20, and a second touch electrode wire 32 corresponding to the second second touch electrode 22 has a portion with the second largest length in the touch region 20, and so on. A second touch electrode wire 32 corresponding to the nth second touch electrode 22 most proximate to the wiring region 40 has a portion with the smallest length in the touch region 20. Therefore, a difference in resistances of portions of the second touch electrode wires 32 that are located in the touch region 20 is great.

A resistance R of a wire satisfies the following formula:

$$R = \rho \times \frac{L}{S}.$$

Where ρ is a resistivity of the wire, L is a length of the wire, and S is an area of a cross-section of the wire.

Since the second touch electrode wires 32 are generally made of a same conductive material, resistivities of the second touch electrode wires 32 are equal. In addition, for convenience of design, areas of cross-sections of the second touch electrode wires 32 are equal (or approximately equal).

Therefore, overall lengths of the second touch electrode wires 32 corresponding to respective second touch electrodes 22 may be set to be equal (or approximately equal), thereby achieving an equal resistance (or an approximately equal resistance) of the second touch electrode wires 32, and avoiding a signal delay due to a great difference in resistance.

For example, the equal resistance (or the approximately equal resistance) may be achieved by adjusting lengths of the portions of the second touch electrode wires 32 that are located in the wiring region 40.

That is, the second touch electrode wire 32 corresponding to the first second touch electrode 22 is configured to have the smallest length in the wiring region 40, and the second touch electrode wire 32 corresponding to the second second touch electrode 22 is configured to have the second smallest length in the wiring region 40, and so on. The second touch electrode wire 32 corresponding to the nth second touch electrode 22 is configured to have the largest length in the wiring region 40.

That is to say, the more proximate a second touch electrode 22 is to the wiring region 40, the smaller a length of a portion of the corresponding second touch electrode wire 32 that is located in the touch region 20 is, and the larger a length of a portion of the corresponding second touch electrode wire 32 that is located in the wiring region 40 is. In this way, the lengths of the second touch electrode wires 32 corresponding to the second touch electrodes 22 are equal (or approximately equal), thereby achieving the equal resistance (or the approximately equal resistance).

Here, a manner of adjusting the overall length of each second touch electrode wire 32 includes, but is not limited to the manner shown in FIG. 5. That is, second touch electrode wires 32 have portions with smaller lengths in the touch region 20, and portions of these second touch electrode wires 32 located in the wiring region 40 are arranged to be meander lines. Or, the portions of these second touch electrode wires 32 located in the touch region 20 may also arranged to be wavy lines. Some embodiments of the present disclosure do not limit this, as long as the overall lengths of the second touch electrode wires 32 are equal (or approximately equal).

Figure 6A:
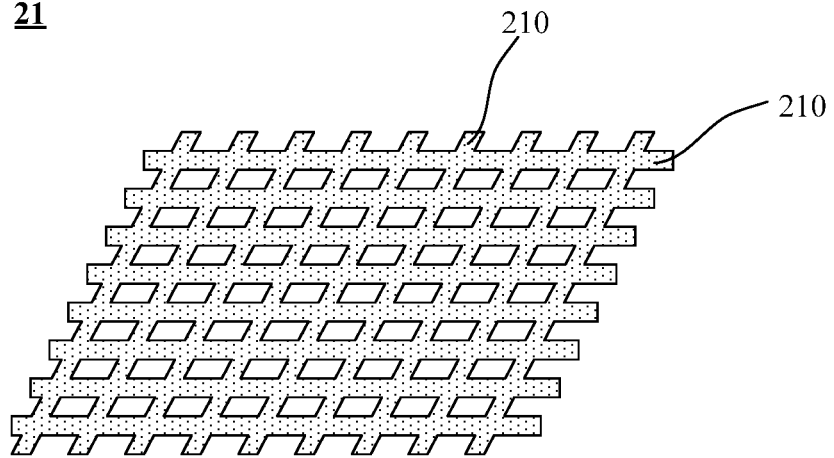
FIG. 6A is an enlarged schematic diagram showing a partial structure of a first touch electrode in a touch structure, according to some embodiments of the present disclosure.
Figure 6B:
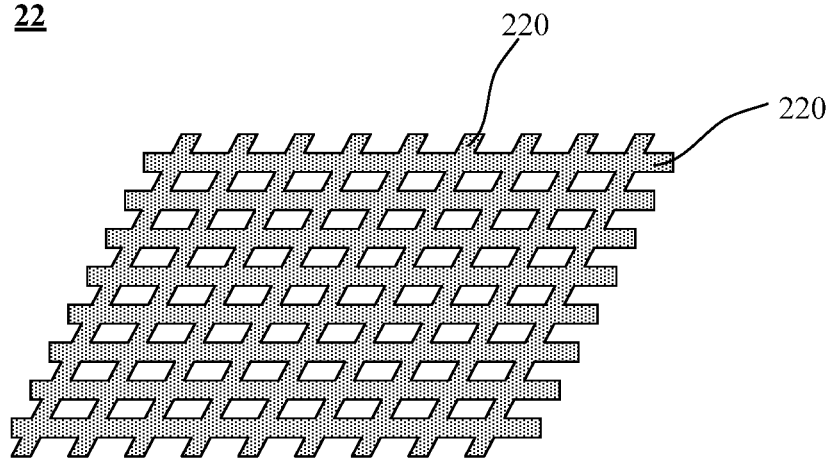
FIG. 6B is an enlarged schematic diagram showing a partial structure of a second touch electrode in a touch structure, according to some embodiments of the present disclosure.

Of course, as for the first touch electrode wires 31 corresponding to the first touch electrodes 21, lengths of the first touch electrode wires 31 may be made equal (or approximately equal), thereby achieving an equal resistance (or an approximately equal resistance) and avoiding a signal delay. For example, as shown in FIG. 6A, each first touch electrode 21 is composed of a plurality of metal wires 210. As shown in FIG. 6B, each second touch electrode 22 is composed of a plurality of metal wires 220.

Here, the plurality of metal wires 210 forming the first touch electrode 21 may be crossed to form a mesh shape. That is, each first touch electrode 21 may have a metal mesh structure.

Similarly, the plurality of metal wires 220 forming the second touch electrode 22 may be crossed to form a mesh shape. That is, each second touch electrode 22 may be a metal mesh structure.

It will be understood that, an enlarged structure of each first touch electrode 21 in FIGS. 1A and 2A may be the metal mesh structure shown in FIG. 6A. Similarly, an enlarged structure of each second touch electrode 22 in FIGS. 1A and 2A may be the metal mesh structure shown in FIG. 6B.

Of course, the plurality of metal wires 210 forming the first touch electrode 21 and the plurality of metal wires 220 forming the second touch electrode 22 may also form other shapes. Some embodiments of the present disclosure do not limit this. The mesh shapes shown in FIGS. 6A and 6B are merely examples.

It will be seen from the above description that, each first touch electrode 21 and each second touch electrode 22 is made of a metal material. The metal material may be a metal element or an alloy or the like, such as, silver (Ag), copper (Cu), aluminum (Al), or aluminum-niobium (AlNb) alloy.

It will be noted that, in a case where each first touch electrode 21 and each second touch electrode 22 is made of a conventional transparent conductive material, such as an indium tin oxide (ITO) material, since the transparent conductive material has a high light transmittance, the touch electrodes may be strip-shaped. Of course, the touch electrodes may have a mesh shape.

In the case where the touch structure 01 is applied to the display device, the touch region 20 of the touch structure 01 generally corresponds to and completely overlaps with the display region of the display panel in the display device. In a case where each first touch electrode 21 and each second touch electrode 22 is made of the metal material, since the metal material is generally opaque (or low light transmittance), in order to prevent the touch structure 01 from affecting a display effect, there is a need to ensure that the touch structure 01 has a certain light transmittance as a whole.

For this reason, each first touch electrode 21 and each second touch electrode 22 each is configured to be composed of a plurality of metal wires, and these metal wires are correspondingly disposed in a non-light-emitting region of the display region, thereby preventing the opaque metal wires (or the metal wires with a low light transmittance) from affecting the display effect.

Herein, the above "non-light-emitting region" is further described. A person skilled in the art will know that the display panel includes a plurality of sub-pixels arranged in an array in the display region, signal line(s) (one or more) are provided between two adjacent rows of sub-pixels and between two adjacent columns of sub-pixels, and regions where these signal lines are located are not used for displaying an image. However, an area of a region between the two adjacent rows of sub-pixels and an area of a region between the two adjacent columns of sub-pixels are very small, and the human eyes usually will not perceive these regions. Therefore, as for an entire display panel, an entire region where all of the sub-pixels are located may still be considered as the display region.

In this way, in an aspect, in a case where each first touch electrode 21 and each second touch electrode 22 is composed of a plurality of metal wires, the light transmittance of an entire touch structure 01 may be better.

In another aspect, since the resistivity of the metal material is generally very small, resistance capacitance (RC) delays of the touch electrodes may be reduced. In a case where the touch structure 01 is applied to the display device having a large size, the touch electrodes may also be driven by an integrated circuit (IC), and multi-touch may be synchronously supported. Therefore, a better touch effect may be achieved.

In yet another aspect, compared with the transparent conductive material such as the ITO, since the resistivity of the metal material is very small, an overall conductivity of each first touch electrode 21 made of the metal material may be better, thereby avoiding an electrostatic discharge (ESD) due to a great difference in potentials at different regions of the first touch electrode 21. Similarly, an overall conductivity of each second touch electrode 22 made of the metal material may be better, thereby avoiding an electrostatic discharge (ESD) due to a great difference in potentials at different regions of the second touch electrode 22.

On this basis, a portion of each first touch electrode wire 31 in the touch region 20 and a portion of each second touch electrode wire 32 in the touch region 20 may also be correspondingly disposed in the non-light-emitting region of the display region, so as to prevent these touch electrode wires from affecting the display effect. In some embodiments of the present disclosure, each first touch electrode 21 and each second touch electrode 22 is separated by insulating layer(s), and the insulating layer(s) are at least located at a position where the first touch electrode 21 intersects with the second touch electrode 22.

That is to say, the insulating layer may be a whole layer, or there may be a plurality of insulating layers. Each insulating layer is located at the position where each first touch electrode 21 intersects with each second touch electrode 22. Based on this, specific arrangement manners of the first touch electrodes 21, the second touch electrodes 22, the first touch electrode wires 31, the second touch electrode wires 32, and the insulating layer(s) that are at least located at the position where each first touch electrode 21 intersects with each second touch electrode 22 may include the following situations.

Figure 7:
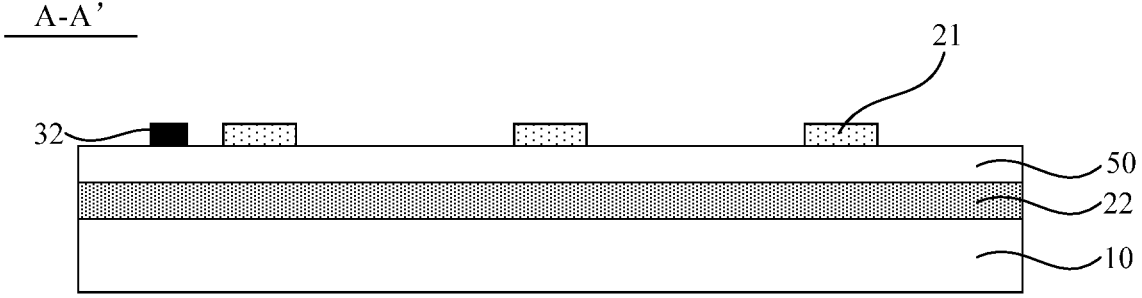
FIG. 7 is a schematic cross-sectional diagram taken along line AA' in FIG. 2A.

In a first arrangement manner:

As shown in FIGS. 1A, 2A and 7, an orthographic projection of portions of the touch structure 10 in the touch region 20 on the base 10 is located within a range of an orthographic projection of the insulating layer 50 on the base 10 (that is, the insulating layer 50 covers the touch region 20), and all of the first touch electrodes 21 and all of the second touch electrodes 22 are disposed on both sides of the insulating layer 50, respectively.

In this case, all of the second touch electrode wires 32 are disposed in a same layer as all of the first touch electrodes 21, and all of the first touch electrode wires 31 are disposed in a same layer as all of the first touch electrodes 21 or all of the second touch electrodes 22.

It will be noted that, in the following embodiments of the present disclosure, term "disposed in a same layer" means that different structures are disposed on a same surface. In this way, different structures on the same surface may be formed by a single patterning process.

Here, the patterning process includes a photoetching process and an etching process, FIG. 7 only shows an example in which all of the first touch electrodes 21 are located on a side of the insulating layer 50 away from the base 10, all of the second touch electrodes 22 are located on a side of the insulating layer 50 proximate to the base 10, and all of the first touch electrode wires 31 are disposed in the same layer as all of the first touch electrodes. As for situation(s) in which the first touch electrodes 21 are located on the side of the insulating layer 50 proximate to the base 10, and all of the second touch electrodes 22 are located on the side of the insulating layer 50 away from the base 10, and/or, all of the first touch electrode wires 31 are disposed in the same layer as all of the second touch electrodes 22, reference may be made to FIG. 7 for understanding, and details are not described herein again.

In this way, in a case where the touch electrodes and the touch electrode wires are made of the metal material, the touch structure 01 may include two metal layers, and the two metal layers are separated by the insulating layer 50.

As shown in FIG. 7, for example, one metal layer includes: all of the first touch electrodes 21, all of the first touch electrode wires 31, and all of the second touch electrode wires 32, and another metal layer includes all of the second touch electrodes 22.

As for each metal layer, structures of the layer may be formed through a single patterning process. In this way, the number of the patterning processes of the touch structure 01 may be reduced, and a complexity of the processes may be prevented from being increased.

In a second arrangement manner:

As shown in FIGS. 8-11, each second touch electrode 22 is of an integrated structure.

Each first touch electrode 21 includes a plurality of first touch sub-electrodes 211 spaced apart and a plurality of first bridge portions 212, and every two adjacent first touch sub-electrodes 211 are coupled through at least one first bridge portion 212.

In this case, all of the first touch sub-electrodes 211 are disposed in a same layer as all of the second touch electrodes 22, and each first bridge portion 212 and a corresponding second touch electrode 22 are crosswise arranged. All of the second touch electrode wires 32 are disposed in a same layer as all of the first bridge portions 212. All of the first touch electrode wires 31 are disposed in a same layer as all of the first bridge portions 212 or all of the first touch sub-electrodes 211.

It will be noted that, the above description that each second touch electrode 22 is of an integrated structure means that portions of each second touch electrode 22 are located in a same layer and are directly connected together.

Since each second touch electrode 22 is of an integrated structure, and all of the first touch sub-electrodes 211 and all of the second touch electrodes 22 are located in the same layer, two adjacent first touch sub-electrodes 211 in each first touch electrode 21 are electrically connected through a bridge. That is, each first bridge portion 212 and a second touch electrode 22 are crosswise arranged, so as to achieve an electrical connection between the first touch sub-electrodes 211 in each first touch electrode 21.

Figure 8:
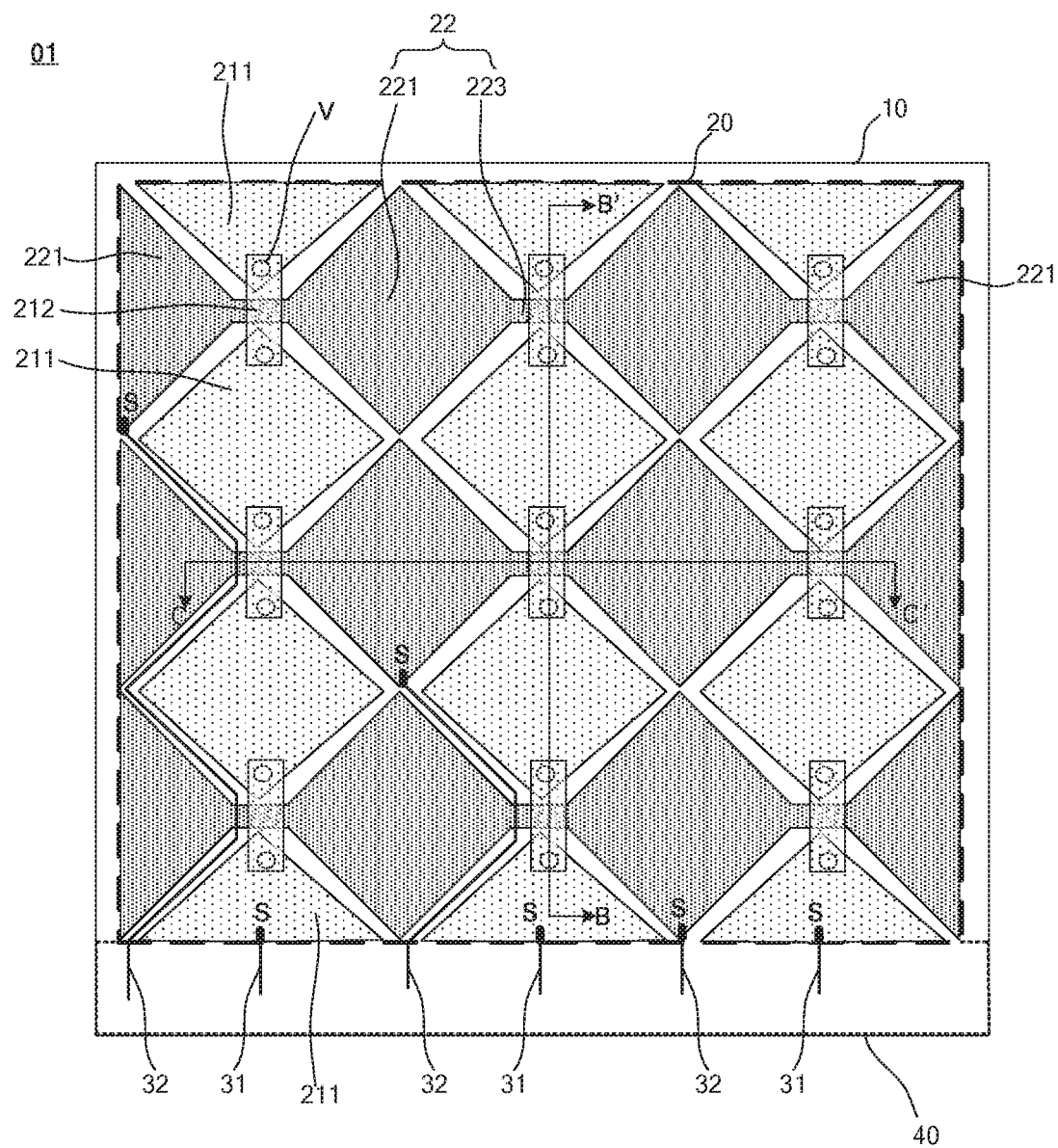
FIG. 8 is a schematic top view of yet another touch structure, according to some embodiments of the present disclosure.

Here, FIG. 8 only shows an example in which every two adjacent first touch sub-electrodes 211 are coupled through a first bridge portion 212. The number of the first bridge portions 212 between every two adjacent first touch sub-electrodes 211 may be flexibly set according to actual needs, and some embodiments of the present disclosure do not limit this.

Figure 9:
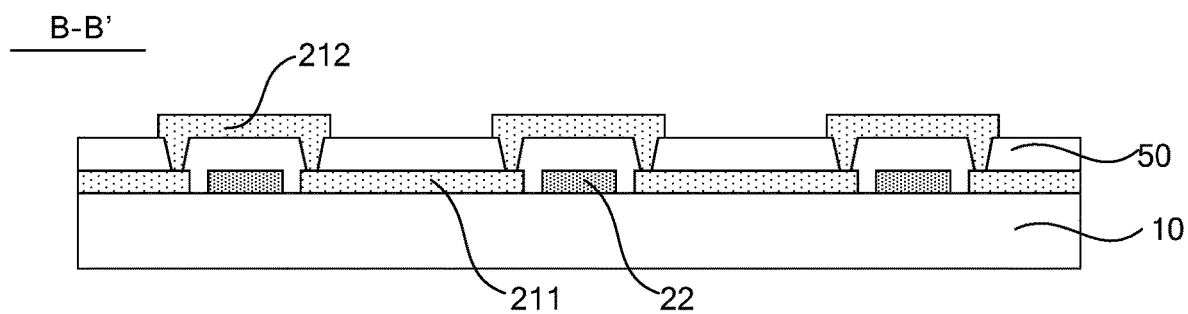
FIG. 9 is a schematic cross-sectional diagram taken along line BB' in FIG. 8.
Figure 10:
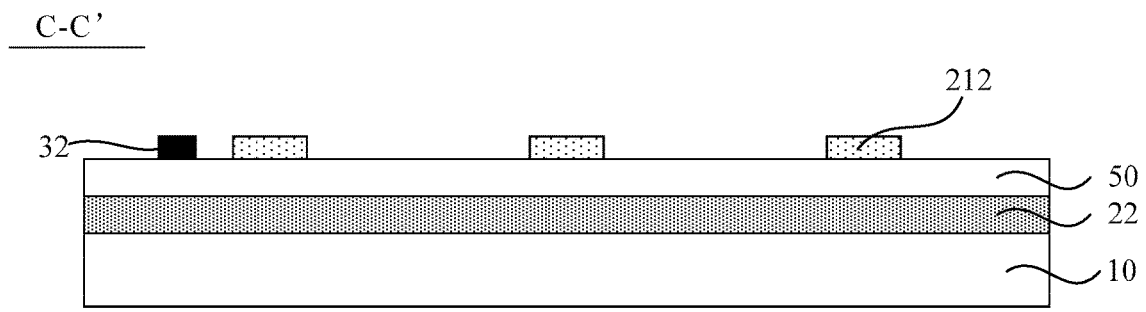
FIG. 10 is a schematic cross-sectional diagram taken along line CC' in FIG. 8.

Moreover, FIGS. 9 and 10 only show an example in which the insulating layer 50 covers the touch region 20. Since each first bridge portion 212 and two corresponding first touch sub-electrodes 211 are respectively disposed on both sides of the insulating layer 50, the first bridge portion 212 may be connected to the two corresponding first touch sub-electrodes 211 respectively through at least two via holes V.

Of course, there may be a plurality of insulating layers 50, and each insulating layer is located at a position where each first touch electrode 21 intersects with each second touch electrode 22.

In addition, since each first bridge portion 212 and a second touch electrode 22 are crosswise arranged, in a case where all of the first touch sub-electrodes 211 are disposed in the same layer as all of the second touch electrode 22, all of the first bridge portions 212 and all of the first touch sub-electrodes 211 are disposed in different layers.

It will be noted that, FIGS. 9 and 10 only show an example in which all of the first touch electrode wires 31, all of the second touch electrode wires 32, and all of the first bridge portions 212 are located on the side of the insulating layer 50 away from the base 10, and all of the first touch sub-electrodes 211 and all of the second touch electrodes 22 are located on the side of the insulating layer 50 proximate to the base 10.

In this way, in the case where the touch electrodes and the touch electrode wires are made of the metal material, the touch structure 01 may include two metal layers, and the two metal layers are separated by the insulating layer 50.

As shown in FIGS. 9 and 10, for example, one metal layer includes all of the first touch electrode wires 31, all of the second touch electrode wires 32, and all of the first bridge portions 212, and another metal layer includes all of the first touch sub-electrodes 211 and all of the second touch electrodes 22.

As for each metal layer, the structures of the layer may be formed through a single patterning process. In this way, the number of the patterning processes of the touch structure 01 may be reduced, and the complexity of the processes may be prevented from being increased.

In some embodiments of the present disclosure, as shown in FIG. 8, in each first touch electrode 21, other than first touch sub-electrodes 211 at two outermost ends, remaining first touch sub-electrodes 211 each have a diamond shape.

Each second touch electrode 22 includes a plurality of second touch sub-electrodes 221 spaced apart and a plurality of second connection portions 223, and every two adjacent second touch sub-electrodes 221 are connected through at least one second connection portion 223. In each second touch electrode 22, other than second touch sub-electrodes 221 at two outermost ends, remaining second touch sub-electrodes 221 each have a diamond shape.

In this case, each second touch electrode wire 32 may be correspondingly disposed at a gap between a portion of a first touch electrode 21 and some of the second touch electrodes 22.

It will be understood that, two outermost ends of each first touch electrode 21 are two ends in an extending direction of the first touch electrode 21. Similarly, two outermost ends of each second touch electrode 22 are two ends in the extending direction of the second touch electrode 22.

Here, in a case where each first touch electrode 21 is made of the transparent material such as the ITO, the first touch sub-electrode 211 may be a block-shaped electrode. In this way, other than the first touch sub-electrodes 211 at the two outermost ends, an orthographic projection of each of the remaining first touch sub-electrodes 211 on the base 10 has a diamond shape.

In a case where each first touch electrode 21 is composed of a plurality of metal wires 210, the above description that other than first touch sub-electrodes 211 at two outermost ends, remaining first touch sub-electrodes 211 each have a diamond shape means that a contour of the orthographic projection of each of the remaining first touch sub-electrodes 211 on the base 10 has a diamond shape.

On this basis, since the touch region 20 generally has a rectangular shape, in each first touch electrode 21, the first touch sub-electrodes 211 at the two outermost ends may each have a shape of a half of a diamond. That is, the first touch sub-electrodes 211 at the two outermost ends may each have a shape of an isosceles triangle. And, a bottom edge of each isosceles triangle faces an edge of the touch region 20, so that the edge of the touch region 20 is also provided with the first touch sub-electrodes 211, thereby ensuring that there is no blind touch region on the edge of the touch region 20.

Similarly, in each second touch electrode 22, the second touch sub-electrodes 221 at the two outermost ends may each have a shape of a half of a diamond. That is, the second touch sub-electrodes 221 at the two outermost ends may each have a shape of an isosceles triangle. And, a bottom edge of each isosceles triangle faces the edge of the touch region 20, so that the edge of the touch region 20 is also provided with the second touch sub-electrodes 221, thereby ensuring that there is no blind touch region on the edge of the touch region 20.

Figure 11:
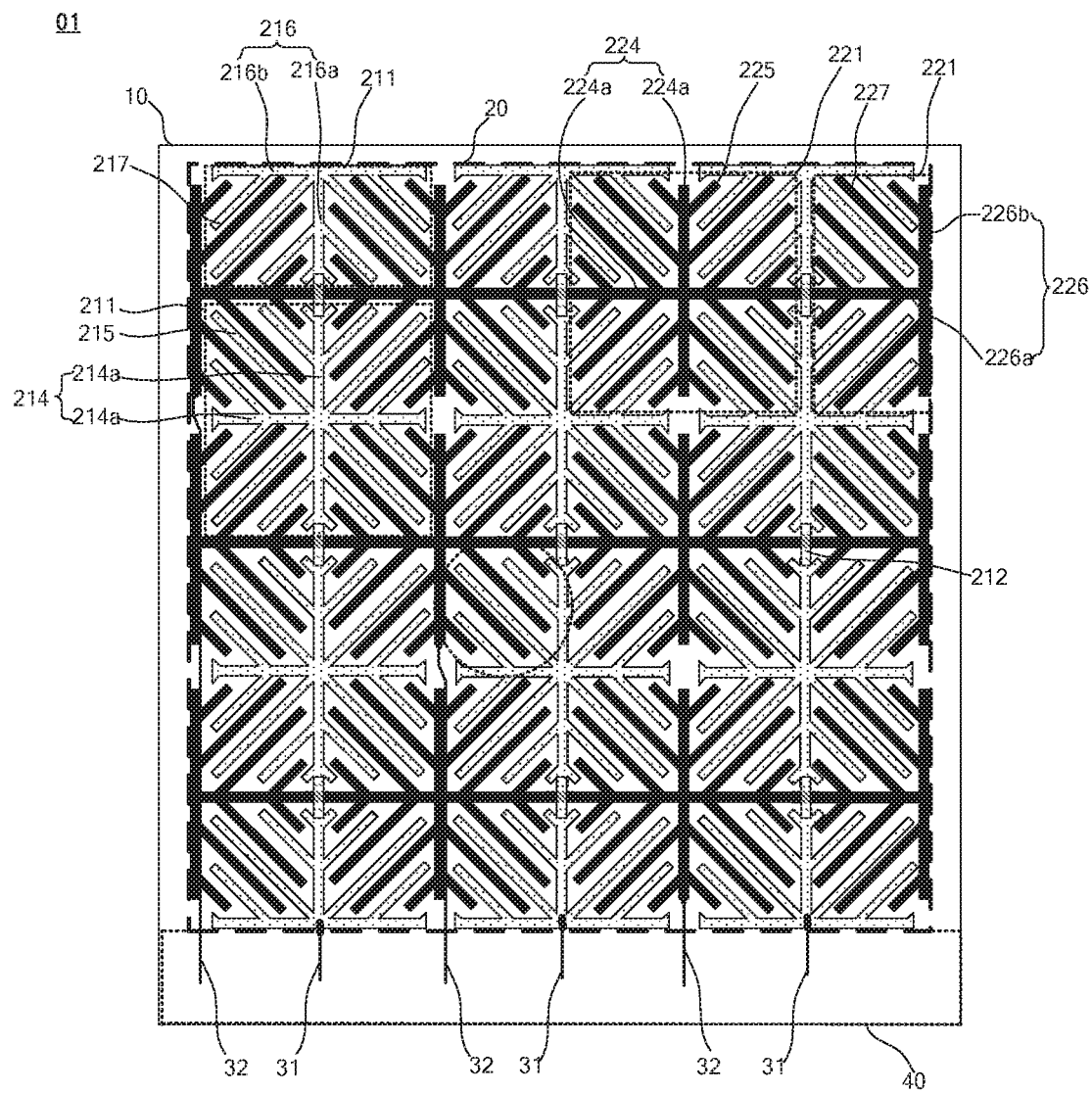
FIG. 11 is a schematic top view of yet another touch structure, according to some embodiments of the present disclosure.

In some embodiments of the present disclosure, as shown in FIG. 11, in each first touch electrode 21, other than the first touch sub-electrodes 211 at the two outermost ends, each of the remaining first touch sub-electrodes 211 includes: a first cross-shaped body 214 composed of two first strip-shaped portions 214a that are crosswise arranged, and at least a plurality of first branches 215 extending from the first strip-shaped portions 214a and symmetrically arranged.

Each second touch electrode 22 includes a plurality of second touch sub-electrodes 221 connected in a sequence. In each second touch electrode 22, other than the second touch sub-electrodes 221 at the two outermost ends, each of the remaining second touch sub-electrodes 221 includes: a second cross-shaped body 224 composed of two second strip-shaped portions 224a that are crosswise arranged, and at least a plurality of second branches 225 extending from the second strip-shaped portions 224a and symmetrically arranged.

It will be noted that, in each of the remaining first touch sub-electrodes 211 in addition to first branches extending from the first strip-shaped portions 214a, some first branches 215 may extend from around a position where the two first strip-shaped portions 214a intersect with each other. Similarly, in each of the remaining second touch sub-electrodes 221, in addition to second branches extending from the second strip-shaped portions 224a, some second branches 225 may extend from around a position where the two second strip-shaped portions 224a intersect with each other.

Here, a length and a width of the first strip-shaped portion 214a are not limited, and a shape of the first branch 215 and the number of the first branches 215 are not limited, which may be flexibly set according to a size of the touch region 20, and a touch accuracy and a sensitivity that are required. Similarly, a length and a width of the second strip-shaped portion 224a are not limited, and a shape of the second branch 225 and the number of the second branches 225 are not limited, which may be flexibly set according to the size of the touch region 20, and the touch accuracy and the sensitivity that are required.

For example, as shown in FIG. 11, in each of the remaining first touch sub-electrodes 211, first branches 215 extending from one first strip-shaped portion 214a are obliquely disposed in a direction away from another first strip-shaped portion 214a.

Similarly, as shown in FIG. 11, in each of the remaining second touch sub-electrodes 221, second branches 225 extending from one second strip portion 224a are obliquely disposed in a direction away from another second strip-shaped portion 224a.

In this way, the first branches 215 and the second branches 225 may be evenly distributed in the touch region 20, thereby improving the touch accuracy and the sensitivity.

Here, oblique angles of the first branches 215 and the second branches 225 may be exactly the same, totally different, or not exactly the same, which may be flexibly set according to actual needs. Some embodiments of the present disclosure do not limit this.

On this basis, since the touch region 20 generally has a rectangular shape, the first touch sub-electrodes 211 at the two outermost ends in each first touch electrode 21 may each have a half shape of the remaining first touch sub-electrodes 211.

That is, the first touch sub-electrodes 211 at the two outermost ends each include a first T-shaped body 216 composed of a third strip-shaped portion 216a and a fourth strip-shaped portion 216b in which an end of the third strip-shaped portion 216a is connected to the fourth strip-shaped portion 216b, and at least a plurality of third branches 217 respectively extending from the third strip-shaped portion 216a and the fourth strip-shaped portion 216b and symmetrically arranged.

All of the third branches 217 and the third strip-shaped portion 216a are located at a same side of the fourth strip-shaped portion 216b, and are disposed away from the edge of the touch region 20. In this way, the edge of the touch region 20 is also provided with the first touch sub-electrodes 211, thereby ensuring that there is no blind touch region on the edge of the touch region 20.

It will be noted that, in each of the first touch sub-electrodes 211 at the two outermost ends, in addition to third branches 217 extending from the third strip-shaped portion 216a and the fourth strip-shaped portion 216b, other third branches 217 may also extend from both sides of a position where the third strip-shaped portion 216a is connected to the fourth strip-shaped portion 216b.

Similarly, in each second touch electrode 22, the second touch sub-electrodes 221 at the two outermost ends may also each have a half shape of the remaining second touch sub-electrodes 221.

That is, the second touch sub-electrodes 221 at the two outermost ends each include a second T-shaped body 226 composed of a fifth strip-shaped portion 226a and a sixth strip-shaped portion 226b in which an end of the fifth strip-shaped portion 226a is connected to the sixth strip-shaped portion 226b, and at least a plurality of fourth branches 227 respectively extending from the fifth strip-shaped portion 226a and the sixth strip-shaped portion 226b and symmetrically arranged.

All of the fourth branches 227 and the fifth strip-shaped portion 226a are located at a same side of the sixth strip-shaped portion 226b, and are disposed away from the edge of the touch region 20. In this way, the edge of the touch region 20 is also provided with the second touch sub-electrodes 221, thereby ensuring that there is no blind touch region on the edge of the touch region 20.

It will be noted that, in each of the second touch sub-electrodes 221 at the two outermost ends, in addition to fourth branches 227 extending from the fifth strip-shaped portion 226a and the sixth strip-shaped portion 226b, other fourth branches 227 may also extend from both sides of a position where the fifth strip-shaped portion 226a is connected to the sixth strip-shaped portion 226b.

Figure 12:
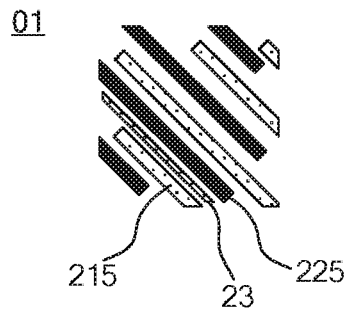
FIG. 12 is a schematic diagram showing a structure of a dummy touch electrode in a touch structure, on a basis of the structure shown in FIG. 11.

On this basis, as shown in FIG. 12, the touch structure 01 may further include at least one dummy touch electrode 23. Each dummy touch electrode 23 is located between a first branch 215 of a first touch sub-electrode 211 and a second branch 225 of a second touch sub-electrode 221 proximate to the first branch 215.

Here, FIG. 12 corresponds to the dotted circle in FIG. 11. For convenience of description, FIG. 12 only shows one of the at least one dummy touch electrode 23.

Here, the dummy touch electrode 23 means that no potential is applied to the electrode to maintain the electrode in a floating state. In this way, in one aspect, since a gap between a first branch 215 and a second branch 225 proximate to the first branch 215 is very small, the provided dummy touch electrode 23 may prevent an ESD from occurring between the first branch 215 and the second branch 225.

In another aspect, in a case where all of the first touch electrodes 21, all of the second touch electrodes 22, and all of the dummy touch electrode(s) 23 are made of the metal material, there is a certain gap between a first branch 215 and a second branch 225 proximate to the first branch 215, and the gap may be considered as a blank region. In a case where there is no other structures in the blank region, the blank region is easy to be directly perceived by the human eyes, and in turn the first branch 215 and the second branch 225 around the blank region are also perceived by the human eyes, thereby affecting the display effect in the case where the touch structure 01 is applied to the display device. By providing the dummy touch electrode 23 between the first branch 215 and the second branch 225 proximate to the first branch 215, the blank region may also be provided with the certain structure therein. That is, the blank region is not easily perceived by the human eyes, and in turn the first branch 215 and the second branch 225 around the blank region are not perceived by the human eyes either, thereby improving a shadow elimination effect of the touch structure 01.

Here, a dummy touch electrode 23 may also be disposed between a third branch 217 and a fourth branch 227 proximate to the third branch 217, so that the shadow elimination effect of the touch structure 01 may be further improved. As for a specific principle, reference may be made to the above embodiments, and details are not described herein again.

Moreover, each dummy touch electrode 23 may also be composed of a plurality of metal wires, and thus has, for example, a mesh shape. As for a description of the mesh shape, reference may be made to the above embodiments, and details are not described herein again.

In addition, in a process that each second touch electrode wire 32 extends from the starting point S in the touch region 20 to the wiring region 40, an orthographic projection of the second touch electrode wire 32 on the base 10 may overlap with some of the second touch electrodes 22 to achieve a shadow elimination.

Figure 13:
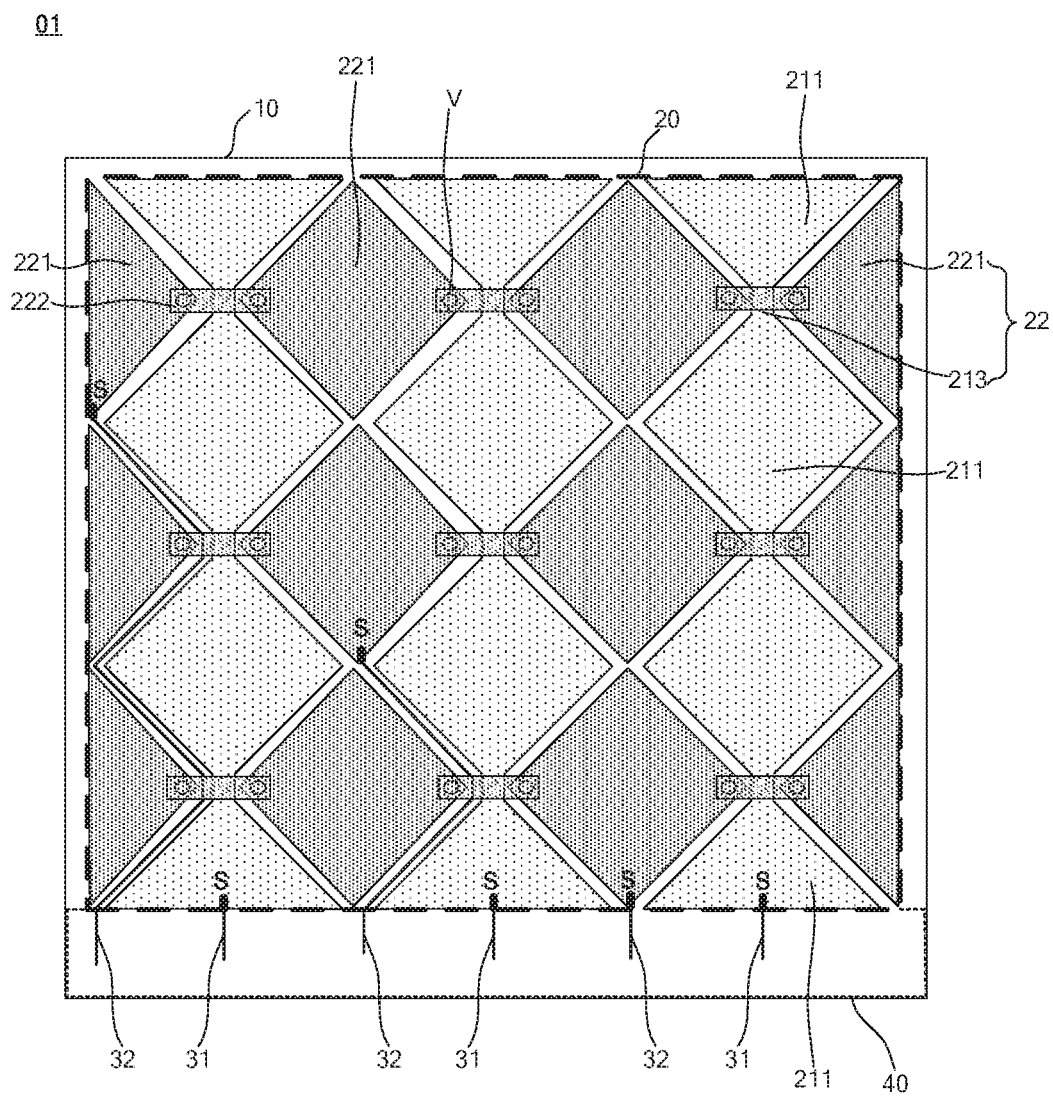
FIG. 13 is a schematic top view of yet another touch structure, according to some embodiments of the present disclosure.
Figure 14:
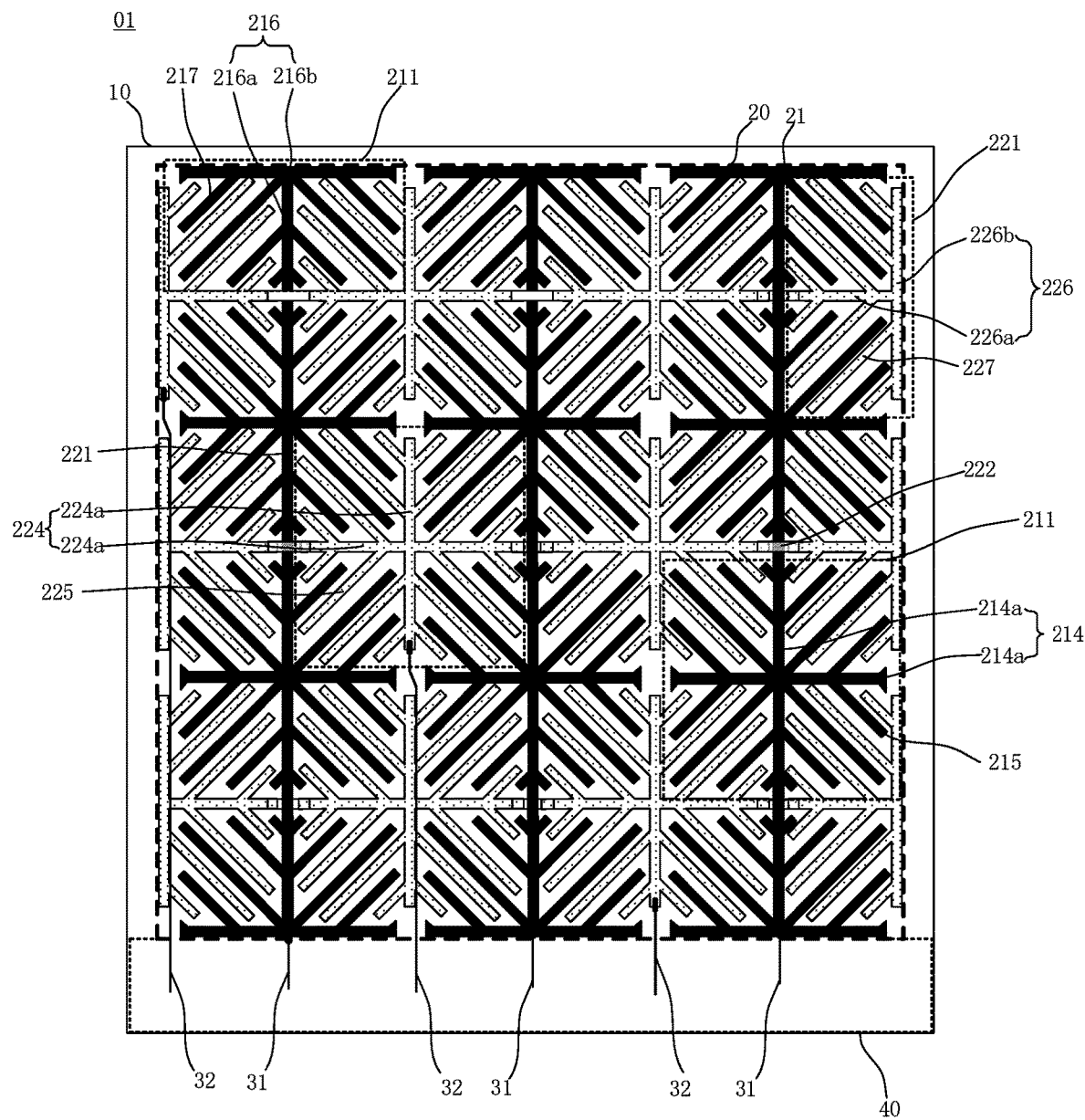
FIG. 14 is a schematic top view of yet another touch structure, according to some embodiments of the present disclosure.

In a third arrangement manner:

As shown in FIGS. 13 and 14, each first touch electrode 21 is of an integrated structure.

Each second touch electrode 22 includes a plurality of second touch sub-electrodes 221 spaced apart, and every two adjacent second touch sub-electrodes 221 are coupled through at least one second bridge portion 222.

In this case, all of the second touch sub-electrodes 221 are disposed in a same layer as all of the first touch electrodes 21, and each second bridge portion 222 and a first touch electrode 21 are crosswise arranged. All of the second touch electrode wires 32 are disposed in a same layer as all of the second touch sub-electrodes 221 or all of the second bridge portions 222. Or, a portion of at least one second touch electrode wire 32 is disposed in a same layer as all of the second touch sub-electrodes 221, and another portion of the at least one second touch electrode wire 32 is disposed in a same layer as all of the second bridge portions 222. And, all of the first touch electrode wires 31 are disposed in a same layer as all of the first touch electrodes 21 or all of the second bridge portions 222.

It will be noted that, as for a description of being disposed in a same layer, reference may be made to the above embodiments, and details are not described herein again.

The above description that each first touch electrode 21 is of an integrated structure means that portions of each first touch electrode 21 are located in a same layer and are directly connected together.

Since each first touch electrode 21 is of an integrated structure, and all of the second touch sub-electrodes 221 and all of the first touch electrodes 21 are located in the same layer, two adjacent second touch sub-electrodes 221 in each second touch electrode 22 are coupled through a bridge. That is, each second bridge portion 222 and a first touch electrode 21 are crosswise arranged, so as to achieve an electrical connection between the second touch sub-electrodes 221 in each second touch electrode 22.

Here, FIG. 13 only shows an example in which every two adjacent second touch sub-electrodes 221 are coupled through a second bridge portion 222. The number of the second bridge portions 222 between every two adjacent second touch sub-electrodes 221 may be flexibly set according to actual needs, and some embodiments of the present disclosure do not limited this.

Moreover, the third arrangement manner is described only by taking the example in which the insulating layer 50 covers the touch region 20. Since each second bridge portion 222 and two corresponding second touch sub-electrodes 221 are respectively disposed on both sides of the insulating layer 50, the second bridge portion 222 may be connected to the two corresponding second touch sub-electrodes 221 respectively through at least two via holes V.

In addition, since each second bridge portion 222 and a first touch electrode 21 are crosswise arranged, in a case where all of the second touch sub-electrodes 221 are disposed in the same layer as all of the first touch electrode 21, all of the second bridge portions 222 and all of the second touch sub-electrodes 221 are disposed in different layers.

In this way, in the case where the touch electrodes and the touch electrode wires are made of the metal material, the touch structure 01 may include two metal layers, and the two metal layers are separated by the insulating layer 50. As for each metal layer, the structures of the layer may be formed through a single patterning process. In this way, the number of the patterning processes of the touch structure 01 may be reduced, and the complexity of the processes may be prevented from being increased.

Specific structures included in each metal layer may be flexibly provided, and details are not described herein again.

In some embodiments of the present disclosure, as shown in FIG. 13, each first touch electrode 21 includes a plurality of first touch sub-electrodes 211 spaced apart and a plurality of first connection portions 213, and every two adjacent first touch sub-electrodes 211 are connected through at least one first connection portion 213. In each first touch electrode 21, other than the first touch sub-electrodes 211 at the two outermost ends, each of the remaining first touch sub-electrodes 211 has a diamond shape.

In each second touch electrode 22, other than the second touch sub-electrodes 221 at the two outermost ends, each of the remaining second touch sub-electrodes 221 has a diamond shape.

In this case, each second touch electrode wire 32 may be correspondingly disposed at a gap between some of the second touch electrodes 221 and a portion of a first touch electrode 21.

Here, as for descriptions of the "two outermost ends" and the "diamond shape", reference may be made to the foregoing embodiments, and details are not described herein again.

On this basis, since the touch region 20 generally has a rectangular shape, in order to ensure that there is no blind touch region on the edge of the touch region 20, the first touch sub-electrodes 211 at the two outermost ends in each first touch electrode 21 may each have a shape of a half of a diamond. That is, the first touch sub-electrodes 211 at the two outermost ends in each first touch electrode 21 may each have a shape of an isosceles triangle. Similarly, in each second touch electrode 22, the second touch sub-electrodes 221 at the two outermost ends may each have a shape of a half of a diamond. That is, the second touch sub-electrodes 221 at the two outermost ends may each have a shape of an isosceles triangle. As for a specific description, reference may be made to the foregoing embodiments, and details are not described herein again.

For example, all of the second touch electrode wires 32 may be disposed in a same layer as all of the second touch sub-electrodes 221.

Figure 15:
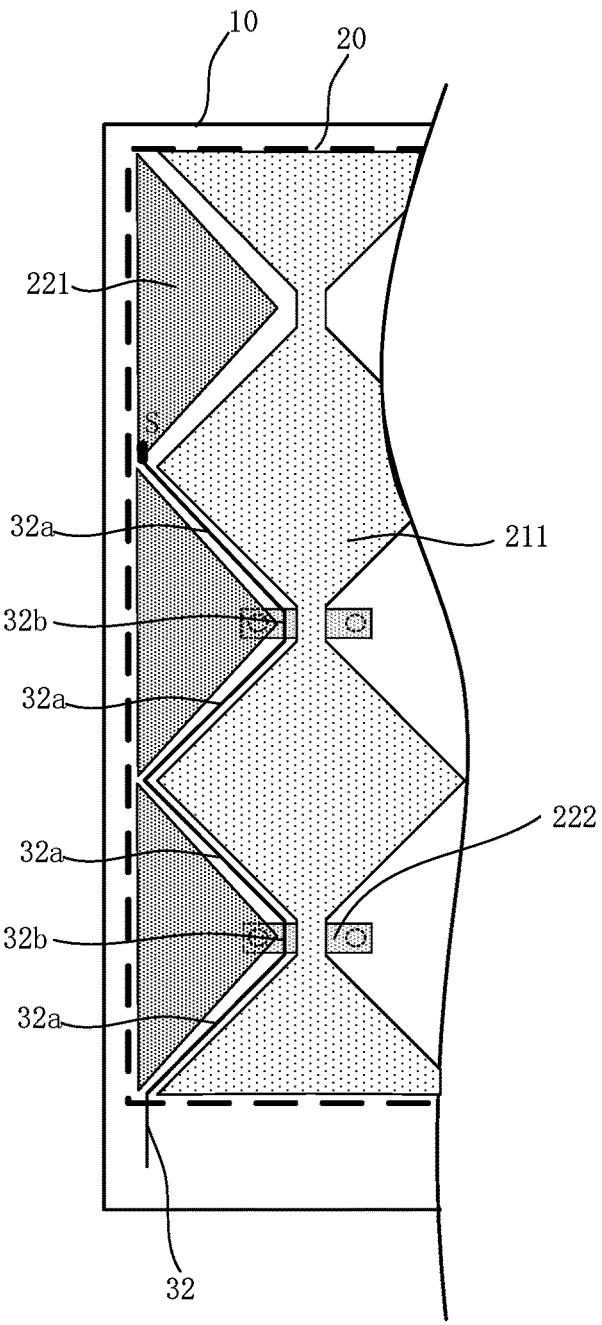
FIG. 15 is a schematic diagram showing structures of different segments of a second touch electrode wire in the touch structure, on a basis of the structure shown in FIG. 13.

Or, as shown in FIG. 15, the at least one second touch electrode wire 32 includes at least one first wire segment 32*a* and at least one second wire segment 32*b*, and in an extending path of the second touch electrode wire 32 in the touch region 20, the second touch electrode wire 32 spans at least one second bridge portion 222.

An orthographic projection of each first wire segment 32*a* on the base 10 does not overlap with an orthographic projection of any second bridge portion 222 on the base 10, and all of the first wire segments 32*a* are disposed in a same layer as all of the second bridge portions 222. An orthographic projection of each second wire segment 32*b* on the base 10 exceeds a range of an orthographic projection of a corresponding second bridge portion 222 on the base 10, and all of the second wire segments 32*b* are disposed in a same layer as all of the second touch sub-electrodes 221.

These second bridge portions 222 corresponding to the at least one second wire segment 32*b* are second bridge portions 222 across which the second touch electrode wire 32 extends in the extending path.

That is to say, at least one portion of the at least one second touch electrode wire 32 and other portion(s) thereof are located at different layers. The first wire segments 32*a* and the second wire segments 32*b* in the second touch electrode wire 32 may be connected through the via holes in the insulating layer 50.

In this way, in a case where the second touch electrode wires 32 are made of the metal material, the second touch electrode wires 32 may not be easily perceived by the human eyes by using the above arrangement manner, thereby achieving the shadow elimination effect.

In some embodiments of the present disclosure, as shown in FIG. 14, each first touch electrode 21 includes a plurality of first touch sub-electrodes 211 connected in a sequence. In each first touch electrode 21, other than the first touch sub-electrodes 211 at the two outermost ends, each of the remaining first touch sub-electrodes 211 includes: a first cross-shaped body 214 composed of two first strip-shaped portions 214*a* that are crosswise arranged, and at least a plurality of first branches 215 extending from the respective first strip-shaped portions 214*a* and symmetrically arranged.

In each second touch electrodes 22, other than the second touch sub-electrodes 221 at the two outermost ends, each of the remaining second touch sub-electrodes 221 includes a second cross-shaped body 224 composed of two second strip-shaped portions 224*a* that are crosswise arranged, and at least a plurality of second branches 225 extending from the respective second strip-shaped portions 224*a* and symmetrically arranged.

All of the second touch electrode wires 32 are disposed in a same layer as all of the second bridge portions 222.

It will be noted that, in each of the remaining first touch sub-electrodes 211, in addition to the first branches 215 extending from the respective first strip-shaped portions 214*a*, some first branches 215 may also extend from around the position where the two first strip-shaped portions 214*a* intersect with each other. Similarly, in each of the remaining second touch sub-electrodes 221, in addition to the second branches 225 extending from the second strip-shaped portions 224*a*, some second branches 225 may also extend from around the position where the two second strip-shaped portions 224*a* intersect with each other.

Here, in each of the remaining first touch sub-electrodes 211, as for an oblique manner of the first branches 215, reference may be made to the foregoing embodiments, and details are not described herein again. Similarly, in each of the remaining second touch sub-electrodes 221, as for an oblique manner of the second branches 225, reference may be made to the foregoing embodiments, and details are not On this basis, since the touch region 20 generally has a rectangular shape, in order to ensure that there is no blind touch region on the edge of the touch region 20, the first touch sub-electrodes 211 at the two outermost ends in each first touch electrode 21 may have a half shape of the remaining first touch sub-electrodes 211.

That is, the first touch sub-electrodes 211 at the two outermost ends each include a first T-shaped body 216 composed of a third strip-shaped portion 216a and a fourth strip-shaped portion 216b, and at least a plurality of third branches 217 extending from the third strip-shaped portion 216a and the fourth strip-shaped portion 216b and symmetrically arranged.

As for specific arrangement manners of the third strip-shaped portion 216a, the fourth strip-shaped portion 216b, and the plurality of third branches 217, reference may be made to the foregoing embodiments, and details are not described herein again.

Similarly, in each second touch electrode 22, the second touch sub-electrodes 221 at the two outermost ends may also each have a half shape of the remaining second touch sub-electrodes 221.

That is, the second touch sub-electrodes 221 at the two outermost ends each include a second T-shaped body 226 composed of a fifth strip-shaped portion 226a and a sixth strip-shaped portion 226b, and at least a plurality of fourth branches 227 extending from the fifth strip-shaped portion 226a and the sixth strip-shaped portion 226b and symmetrically arranged.

As for specific arrangement manners of the fifth strip-shaped portion 226a, the sixth strip-shaped portion 226b, and the plurality of fourth branches 227, reference may be made to the foregoing embodiments, and details are not described herein again.

On this basis, the touch structure 01 may further include at least one dummy touch electrode 23. Each dummy touch electrode 23 is located between a first branch 215 of a first touch sub-electrode 211 and a second branch 225 of a second touch sub-electrode 221 proximate to the first branch 215. As for a position, a structure and a function of the dummy touch electrode 23, reference may be made to FIG. 12 and the foregoing embodiments, and details are not described herein again.

Moreover, in the process that each second touch electrode wire 32 extends from the starting point S in the touch region 20 to the wiring region 40, the orthographic projection of the second touch electrode wire 32 on the base 10 may overlap with some of the first touch electrodes 21 to achieve the shadow elimination.

It will be understood that, as for the above three arrangement manners, in order to reduce an arrangement complexity of wires in the touch region 20, for example, the starting point S of each first touch electrode wire 31 is located at a bottom of the corresponding first touch electrode 21 proximate to the wiring region 40.

Figure 16:
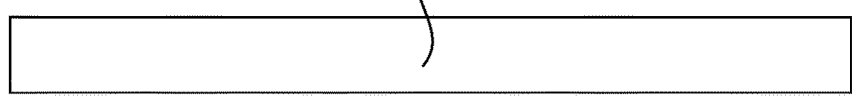
FIG. 16 is a schematic diagram showing a structure of a touch screen, according to some embodiments of the present disclosure.

Some embodiments of the present disclosure provide a touch screen. As shown in FIG. 16, the touch screen 02 includes the touch structure 01. The touch screen 02 has a same effect as the touch structure 01 provided by the foregoing embodiments, and details are not described herein again.

It will be understood that, for convenience of description, in FIG. 16, the touch structure 01 is only represented by a single layer, and a specific structure of the touch structure 01 is not drawn. As for the specific structure of the touch structure 01, reference may be made to the foregoing embodiments, and details are not described herein again.

Figure 17:
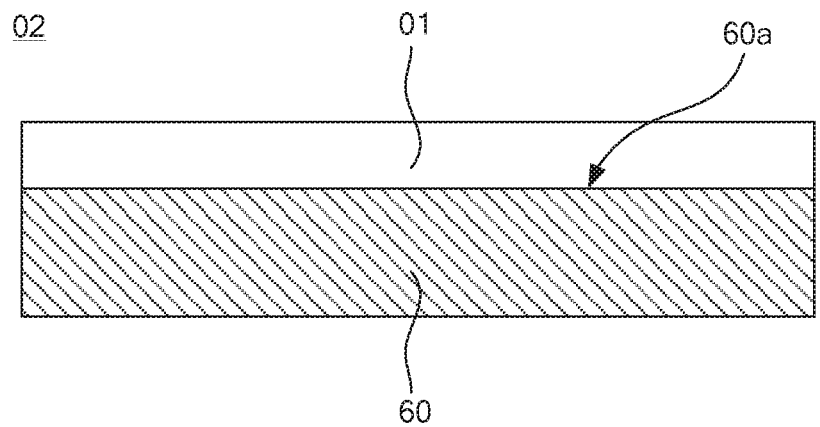
FIG. 17 is a schematic diagram showing a structure of another touch screen, according to some embodiments of the present disclosure.

In some embodiments of the present disclosure, as shown in FIG. 17, the touch screen 02 further includes a display panel 60. The touch structure 01 is disposed on a light exit side 60a of the display panel 60.

It will be understood that, since the touch screen 02 includes the display panel 60 and the touch structure 01, that is, the touch screen 02 has a display function and a touch function, the touch screen may also be referred to as a touch display screen.

Here, the base may be a structure of the display panel 60 at the light exit side 60a. That is, the first touch electrodes 21, the second touch electrodes 22, the first touch electrode wires 31, the second touch electrode wires 32, and the insulating layer 50 that form the touch structure 01 are directly formed on the light exit side 60a of the display panel 60.

Of course, the touch structure 01 may also be provided with a base. Here, as for a description of the "base", reference may be made to the foregoing embodiments, and details are not described herein again.

A type of the display panel 60 is not limited. The display panel 60 may be a liquid crystal display panel or an organic light-emitting diode (OLED) display panel, etc., which may be flexibly set according to actual needs.

For example, in a case where the display panel 60 is the liquid crystal display panel, an array substrate in the liquid crystal display panel may include thin film transistors and pixel electrodes, and a drain of each thin film transistor is coupled to a pixel electrode.

On this basis, the array substrate may further include common electrodes (or a whole common electrode layer). Each common electrode (or the whole common electrode layer) is configured to form an electric field with each pixel electrode to drive a rotation of liquid crystal molecules.

As for an in-plane switch (IPS) array substrate, the pixel electrodes are disposed in a same layer as the common electrodes, and strip-shaped electrodes of a pixel electrode and strip-shaped electrodes of a common electrode are spaced apart.

As for an advanced-super dimensional switching (ADS) array substrate, the pixel electrodes and the common electrodes are located in different layers. In a pixel electrode and a corresponding common electrode, an electrode proximate to the light exit side (i.e., an upper electrode) include strip-shaped electrodes, and an electrode distal to the light exit side (i.e., a lower electrode) is a plate-shaped electrode.

In the case where the display panel is the liquid crystal display panel, the display panel further includes a color filter substrate and a liquid crystal layer between the array substrate and the color filter substrate.

It will be understood that, in the case where the display panel 60 is the liquid crystal display panel, since liquid crystal molecules are incapable of actively emitting light, the touch screen 02 may also form a display device with a backlight module that provides a backlight to the liquid crystal display panel.

In a case where the display panel is the OLED display panel, an array substrate in the OLED display panel may include thin film transistors, anodes each coupled to a drain of a thin film transistor, cathodes (or a whole cathode layer) each disposed opposite to an anode, and functional layers each between an anode and a corresponding cathode (or the whole cathode layer).

An anode, a cathode (or a region of the whole cathode layer corresponding to the anode) and a functional layer form an OLED device.

The functional layer at least includes a light-emitting layer, and may further include an electron-transporting layer and a hole-transporting layer.

On this basis, in order to improve an efficiency that electrons and holes are injected into the light-emitting layer, the functional layer may further include an electron injection layer disposed between each cathode (or a region of the whole cathode layer corresponding to each anode) and the electron-transporting layer, and a hole injection layer disposed between each anode and the hole-transporting layer.

These layers are usually made of an organic material, and will be eroded in a case where these layers are exposed to water vapor and oxygen in air, thereby affecting a light-emitting performance. Therefore, the OLED display panel may further include an encapsulation layer configured to encapsulate OLED devices.

The encapsulation layer may be a flexible thin film encapsulation (TFE) layer or a rigid encapsulation cover plate.

Figure 18:
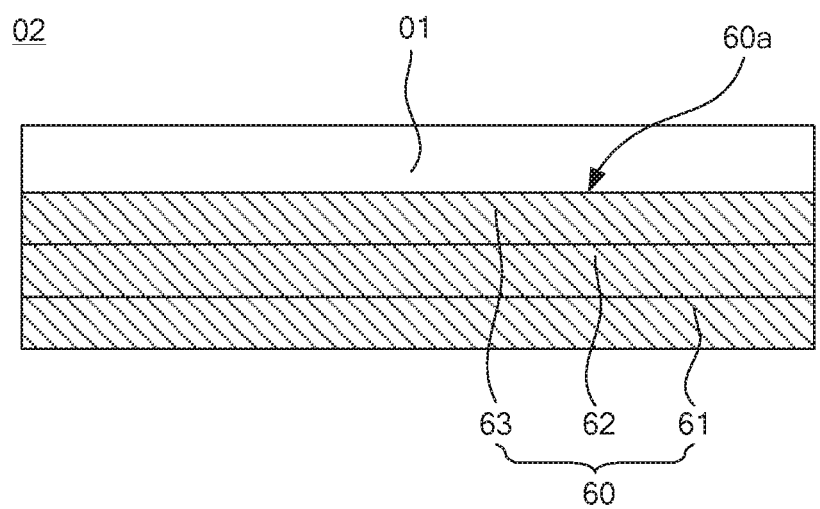
FIG. 18 is a schematic diagram showing a structure of yet another touch screen, according to some embodiments of the present disclosure.

In the case where the display panel is the OLED display panel, the OLED display panel may be flexible. As shown in FIG. 18, the OLED display panel includes a flexible base 61, a plurality of OLED devices 62 disposed on the flexible base 61, and a TFE layer 63.

The touch structure 01 is disposed on a side of the TFE layer 63 away from the flexible base 61.

It will be understood that, for convenience of description, in FIG. 18, the OLED devices 62 are only represented by a single layer, and a specific structure of each OLED device 62 is not drawn.

For example, the first touch electrodes 21, the second touch electrodes 22, the first touch electrode wires 31, the second touch electrode wires 32 and the insulating layer 50 that form the touch structure 01 are directly formed on the side of the TFE layer 63 away from the flexible base 61.

Based on this, the touch screen 02 is a flexible touch screen.

The foregoing descriptions are merely specific implementation methods of the present disclosure, but the protection scope of the present disclosure is not limited thereto. Any person skilled in the art could readily conceive of changes or replacements within the technical scope of the present disclosure, which shall all be included in the protection scope of the present disclosure. Therefore, the protection scope of the present disclosure shall be subject to the protection scope of the claims.

What is claimed is:

1. A touch structure, comprising a plurality of first touch electrodes, a plurality of second touch electrodes, a plurality of first touch electrode wires, and a plurality of second touch electrode wires, wherein
   the touch structure has a touch region and a wiring region on a side of the touch region, and the plurality of first touch electrodes and the plurality of second touch electrodes are located in the touch region;
   each first touch electrode and each second touch electrode is crosswise arranged, and is configured to be insulated from each other;
   each first touch electrode is coupled to at least one first touch electrode wire, and each second touch electrode is coupled to at least one second touch electrode wire;
   resistances of the plurality of first touch electrode wires are approximately equal, resistances of the plurality of second touch electrode wires are approximately equal, and the plurality of first touch electrode wires and the plurality of second touch electrode wires have substantially a same extending direction, wherein,
   each first touch electrode extends in a first direction, and the plurality of first touch electrodes are successively arranged in a direction perpendicular to the first direction;
   each second touch electrode extends in a second direction, and the plurality of second touch electrodes are successively arranged in a direction perpendicular to the second direction; and an angle between the first direction and the second direction is greater than 0°, and is less than or equal to 90°;
   the extending directions of the plurality of first touch electrode wires and the plurality of second touch electrode wires are substantially the first direction;
   the plurality of first touch electrode wires have a same length;
   the plurality of second touch electrode wires have a same length, and the length of each second touch electrode wire is a sum of a length in the touch region and a length in the wiring region of each second touch electrode wire; and
   the length in the touch region of each second touch electrode wire is different from each other and the length in the wiring region of each second touch electrode wire is different from each other.

2. The touch structure according to claim 1, wherein
   each first touch electrode wire is coupled to a corresponding first touch electrode through a first coupling point that is located at an end of the first touch electrode wire; and/or
   each second touch electrode wire is coupled to a corresponding second touch electrode through a second coupling point that is located at an end of the second touch electrode wire.

3. The touch structure according to claim 1, wherein
   the plurality of second touch electrode wires have a same resistivity; and
   the plurality of second touch electrode wires have a same cross-sectional area.

4. The touch structure according to claim 1, wherein
   each first touch electrode is composed of a plurality of first metal wires, and each second touch electrode is composed of a plurality of second metal wires;
   the plurality of first metal wires are crossed, and the first touch electrode has a mesh shape;
   and/or,
   the plurality of second metal wires are crossed, and the second touch electrode has a mesh shape.

5. The touch structure according to claim 4, wherein
   each first touch electrode and each second touch electrode is separated by at least one insulating layer that is at least located at position where each first touch electrode intersects with each second touch electrode.

6. The touch structure according to claim 5, wherein
   the plurality of first touch electrodes and the plurality of second touch electrodes are disposed on both sides of the insulating layer respectively, wherein
   the plurality of second touch electrode wires are disposed in a same layer as the plurality of first touch electrodes; and
   the plurality of first touch electrode wires are disposed in a same layer as the plurality of first touch electrodes or the plurality of second touch electrodes.

7. The touch structure according to claim 5, wherein
   each second touch electrode is of an integrated structure; and
   each first touch electrode includes a plurality of first touch sub-electrodes spaced apart and a plurality of first bridge portions, and every two adjacent first touch sub-electrodes are coupled through at least one first bridge portion, wherein the plurality of first touch sub-electrodes are disposed in a same layer as the plurality of second touch electrodes, and each first bridge portion and a corresponding second touch electrode are crosswise arranged;

the plurality of second touch electrode wires are disposed in a same layer as the plurality of first bridge portions; and the plurality of first touch electrode wires are disposed in a same layer as the plurality of first bridge portions or the plurality of first touch sub-electrodes.

8. The touch structure according to claim 7, wherein
in each first touch electrode, other than first touch sub-electrodes at two outermost ends, remaining first touch sub-electrodes each have a diamond shape; and each second touch electrode includes a plurality of second touch sub-electrodes spaced apart and a plurality of second connection portions, and every two adjacent second touch sub-electrodes are connected through at least one second connection portion; and in each second touch electrode, other than second touch sub-electrodes at two outermost ends, remaining second touch sub-electrodes each have a diamond shape;

the first touch sub-electrodes at the two outermost ends each have a shape of an isosceles triangle, and a top angle of each first touch sub-electrode is more proximate to other first sub-electrodes with the diamond shape in the first touch electrode than a bottom edge of each first touch sub-electrode;

and/or, the second touch sub-electrodes at the two outermost ends each have a shape of an isosceles triangle, and a top angle of each second touch sub-electrode is more proximate to other second sub-electrodes with the diamond shape in the second touch electrode than a bottom edge of each second touch sub-electrode.

9. The touch structure according to claim 7, wherein
in each first touch electrode, other than first touch sub-electrodes at two outermost ends, remaining first touch sub-electrodes each include a first cross-shaped body composed of two first strip-shaped portions crosswise arranged, and at least a plurality of pairs of first branches, each pair of first branches extends from a first strip-shaped portion and is symmetrically arranged relative to the first strip-shaped portion; and each second touch electrode includes a plurality of second touch sub-electrodes connected in a sequence; and in each second touch electrode, other than second touch sub-electrodes at two outermost ends, remaining second touch sub-electrodes each include a second cross-shaped body composed of two second strip-shaped portions crosswise arranged, and at least a plurality of pairs of second branches, each pair of second branches extends from a second strip-shaped portion and is symmetrically arranged relative to the second strip-shaped portion.

10. The touch structure according to claim 9, wherein
in each of the remaining first touch sub-electrodes, first branches extending from one first strip-shaped portion are obliquely disposed in a direction away from another first strip-shaped portion;

and/or, in each of the remaining second touch sub-electrodes, second branches extending from one second strip-shaped portion are obliquely disposed in a direction away from another second strip-shaped portion.

11. The touch structure according to claim 9, wherein
in each first touch electrode, the first touch sub-electrodes at the two outermost ends each include: a first T-shaped body composed of a third strip-shaped portion and a fourth strip-shaped portion in which an end of the third strip-shaped portion is connected to the fourth strip-shaped portion, and at least a plurality of pairs of third branches; at least one pair of third branches extends from the third strip-shaped portion and is symmetrically arranged relative to the third strip-shaped portion, and at least one pair of third branches extends from the fourth strip-shaped portion and is symmetrically arranged relative to the third strip-shaped portion, wherein all of the third branches and the third strip-shaped portion are located at a same side of the fourth strip-shaped portion proximate to other first touch sub-electrodes in the first touch electrode;

and/or, in each second touch electrode, the second touch sub-electrodes at the two outermost ends each include: a second T-shaped body composed of a fifth strip-shaped portion and a sixth strip-shaped portion in which an end of the fifth strip-shaped portion is connected to the sixth strip-shaped portion, and at least a plurality of pairs of fourth branches; at least one pair of fourth branches extends from the fifth strip-shaped portion and is symmetrically arranged relative to the fifth strip-shaped portion, and at least one pair of fourth branches extends from the sixth strip-shaped portion and is symmetrically arranged relative to the fifth strip-shaped portion, wherein all of the fourth branches and the fifth strip-shaped portion are located at a same side of the sixth strip-shaped portion proximate to other second touch sub-electrodes in the second touch electrode.

12. The touch structure according to claim 9, further comprising at least one dummy touch electrode, wherein;
each dummy touch electrode is disposed between a first branch and a second branch that are adjacent to each other.

13. The touch structure according to claim 5, wherein
each first touch electrode is of an integrated structure; and
each second touch electrode includes a plurality of second touch sub-electrodes spaced apart and a plurality of second bridge portions, and every two adjacent second touch sub-electrodes are coupled through at least one second bridge portion, wherein the plurality of second touch sub-electrodes are disposed in a same layer as the plurality of first touch electrodes, and each second bridge portion and a corresponding first touch electrode are crosswise arranged;

the plurality of second touch electrode wires are disposed in a same layer as the plurality of second touch sub-electrodes or the plurality of second bridge portions; or, a portion of at least one second touch electrode wire is disposed in a same layer as the plurality of second touch sub-electrodes, and another portion of the at least one second touch electrode wire is disposed in a same layer as the plurality of second bridge portions; and the plurality of first touch electrode wires are disposed in a same layer as the plurality of first touch electrodes or the plurality of second bridge portions.

14. The touch structure according to claim 13, wherein
each first touch electrode includes a plurality of first touch sub-electrodes spaced apart and a plurality of first connection portions, and every two adjacent first touch sub-electrodes are connected through at least one first connection portion; and in each first touch electrode, other than first touch sub-electrodes at two outermost ends, remaining first touch sub-electrodes each have a diamond shape;

in each second touch electrode, other than second touch sub-electrodes at two outermost ends, remaining second touch sub-electrodes each have a diamond shape; and each second touch electrode wire is disposed at a gap between some of the second touch electrodes and a portion of a first touch electrode, wherein the plurality of second touch electrode wires are disposed in a same layer as the plurality of second touch sub-electrodes; or at least one second touch electrode wire includes at least one first wire segment and at least one second wire segment, and in an extending path of the second touch electrode wire, the second touch electrode wire spans at least one second bridge portion;

an orthographic projection of each first wire segment on a plane where the at least one first wire segment is located does not overlap with an orthographic projection of any second bridge portion on the plane, and the at least one first wire segment is disposed in a same layer as the plurality of second bridge portions; and an orthographic projection of each second wire segment on the plane exceeds a range of an orthographic projection of a corresponding second bridge portion on the plane, and the at least one second wire segment is disposed in a same layer as the plurality of second touch sub-electrodes.

15. The touch structure according to claim 14, wherein
the first touch sub-electrodes at the two outermost ends each have a shape of an isosceles triangle, and a top angle of each first touch sub-electrode is more proximate to other first sub-electrodes with the diamond shape in the first touch electrode than a bottom edge of the first touch sub-electrode;

and/or, the second touch sub-electrodes at the two outermost ends each have a shape of an isosceles triangle, and a top angle of each second touch sub-electrode is more proximate to other second sub-electrodes with the diamond shape in the second touch electrode than a bottom edge of the second touch sub-electrode.

16. The touch structure according to claim 13, wherein
each first touch electrode includes a plurality of first touch sub-electrodes connected in a sequence; and in each first touch electrode, other than first touch sub-electrodes at two outermost ends, remaining first touch sub-electrodes each include a first cross-shaped body composed of two first strip-shaped portions crosswise arranged, and at least a plurality of pairs of first branches, each pair of first branches extends from a first strip-shaped portion and is symmetrically arranged relative to the first strip-shaped portion;

in each second touch electrode, other than second touch sub-electrodes at two outermost ends, remaining second touch sub-electrodes each include a second cross-shaped body composed of two second strip-shaped portions crosswise arranged, and at least a plurality of pairs of second branches, each pair of second branches extends from a second strip-shaped portion and is symmetrically arranged relative to the second strip-shaped portion; and the plurality of second touch electrode wires are disposed in a same layer as the plurality of second bridge portions.

17. A touch screen, comprising the touch structure according to claim 1.

18. The touch screen according to claim 17, further comprising a display panel, wherein the touch structure is disposed on a light exit side of the display panel.

* * * * *